(12) United States Patent
Tomita et al.

(10) Patent No.: US 7,355,771 B2
(45) Date of Patent: Apr. 8, 2008

(54) OPTICAL SCANNING APPARATUS

(75) Inventors: Ken-ichi Tomita, Mishima (JP); Masaki Sato, Numazu (JP); Akihiro Fukutomi, Mishima (JP); Hidekazu Shimomura, Yokohama (JP); Kazumi Kimura, Toda (JP)

(73) Assignee: Canon Kabushiki Kaisha, Tokyo (JP)

( * ) Notice: Subject to any disclaimer, the term of this patent is extended or adjusted under 35 U.S.C. 154(b) by 217 days.

(21) Appl. No.: 11/341,858

(22) Filed: Jan. 30, 2006

(65) Prior Publication Data

US 2006/0164709 A1 Jul. 27, 2006

Related U.S. Application Data

(63) Continuation of application No. PCT/JP2005/014789, filed on Aug. 5, 2005.

(30) Foreign Application Priority Data

Aug. 5, 2004 (JP) .............................. 2004-229189
Aug. 1, 2005 (JP) .............................. 2005-222903

(51) Int. Cl.
 *G02B 26/08* (2006.01)
(52) U.S. Cl. ...................... 359/205; 359/204; 359/212; 359/216
(58) Field of Classification Search ..................... None
See application file for complete search history.

(56) References Cited

U.S. PATENT DOCUMENTS 6,075,636 A 6/2000 Sekikawa ................... 359/204
6,304,360 B1 10/2001 Sekikawa ................... 359/204
6,400,488 B1 6/2002 Nagasaka et al. ........... 359/212
2006/0050348 A1* 3/2006 Shimomura ................. 359/205

FOREIGN PATENT DOCUMENTS

| JP | 64-909 | 1/1989 |
|---|---|---|
| JP | 3-197916 | 8/1991 |
| JP | 6-27902(B2) | 4/1994 |
| JP | 6-35212 | 9/1994 |
| JP | 7-92411 | 4/1995 |
| JP | 10-206767 | 8/1998 |
| JP | 10-325934 | 12/1998 |
| JP | 11-64754 | 3/1999 |
| JP | 11-160638 | 6/1999 |
| JP | 2000-180750 | 6/2000 |
| JP | 2001-166250 | 6/2001 |

* cited by examiner

*Primary Examiner*—James Phan
(74) *Attorney, Agent, or Firm*—Fitzpatrick, Cella, Harper & Scinto

(57) ABSTRACT

An optical scanning device has a light shield plate where a scanning line emitted from a light source passes through a scanning lens, and is reflected by a rotation polygon mirror, and after that, passes through the scanning lens again, and is reflected by the scanning lens at the opposite side of the rotation polygon mirror by nipping the scanning lens, wherein the light shield plate is placed at a position wherein the distance between the rotation polygon mirror and the scanning lens, the thickness in the optical axial direction of the scanning lens, the angle by which the scanning line incident the rotation polygon mirror and the convergent angle of the scanning line satisfies a certain relationship.

27 Claims, 17 Drawing Sheets

OPTICAL SCANNING APPARATUS

This application is a continuation of International Application No. PCT/JP2005/014789 filed on Aug. 5, 2005, which claims the benefit of Japanese Patent Application Nos. 2004-229189 filed on Aug. 5, 2004, and No. 2005-222903 filed on Aug. 1, 2005.

BACKGROUND OF THE INVENTION

1. Field of the Invention

The present invention relates to an optical scanning apparatus to be mounted on an image forming apparatus such as a copier or a printer, and in particular, it relates to an optical scanning apparatus mounted with a so-called double path optical system, in which laser beam (light beam) generated from a light source pass though a scanning lens, and after that, are deflected by a rotation polygon mirror, and then, pass through the scanning lens again, and emit toward a surface to be scanned (photosensitive member).

2. Related Background Art

To increase the number of output sheets of the printer and the copier per unit hour, a scanning speed on the photosensitive member by optical beams must be increased. As a way to increase the scanning speed, though there exist a method of increasing the rotational speed of the rotation polygon mirror, a method of providing a plurality of light sources and turning them into multi beams, and the like, an optical scanning apparatus of an over field type which can gain a number of reflecting surfaces while controlling the diameter of the rotation polygon mirror is also known as one of techniques of increasing the scanning speed. The optical scanning apparatus of the over field type is characterized in that the width in the main scanning direction of the laser beam which comes into the rotation polygon mirror is larger than the width in the main scanning direction of one of the surfaces of the rotation polygon mirror.

In the optical scanning apparatus of this over field type, since a F number of the optical beams deflected by the rotation polygon mirror varies according to the deflection angle, there occurs a phenomenon in which the beam diameter and the light amount of the optical beams become non-uniform along the main scanning direction on the surface to be scanned of the photosensitive member or the like. In order to mitigate this phenomenon, in the optical scanning apparatus of the over field type, it is common to use a system in which optical beams come into the rotation polygon mirror in front with respect to the main scanning direction and with an angle with respect to the sub scanning direction. At this time, to get rid of the limitation of an angle with which the optical beams come into it in the sub scanning direction of the optical beams to the rotation polygon mirror, the optical scanning apparatus of a so-called double path type has been also proposed, in which the optical beams pass through the scanning lens (fθ lens), and come into the rotation polygon mirror, and the optical beams reflected by the rotation polygon mirror transmit the scanning lens again. Japanese Utility Model Publication No. H06-035212 and Japanese Patent Publication No. H06-027902 disclose the optical scanning apparatus of the double path type.

Such optical scanning apparatus of the double path type is an optical scanning apparatus of the mechanism in which the laser beams are allowed to come into the scanning lens, and the outgoing light from the scanning lens is deflected by the rotation polygon mirror, and after that, are allowed to pass though the scanning lens again. The laser beams having passed through the scanning lens twice, after that, are guided to the photosensitive member as an image bearing member of the image forming apparatus, and form an electrostatic latent image on the photosensitive member.

However, usually, when the laser beams pass through the scanning lens, it is not that the whole of the laser beams pass through completely, but that the portion thereof is reflected on the surface of the scanning lens. When these reflected laser beams are reflected by any portion of the apparatus so as to reach the photosensitive member, there is a possibility that an unexpected electrostatic latent image is formed on the photosensitive member. Particularly, as described above, when the laser beams are allowed to pass through the scanning lens twice, reflected lights reflected on the surface of the scanning lens comparatively many times, and the possibility of the reflected light reaching the photosensitive member is also increased.

In particular, since the same light path always exists, the laser reflected by the scanning lens is irradiated at the same position of the center of the photosensitive member before it is deflected by the rotation polygon mirror. Although the amount of this reflected light is few, it becomes a cause of forming an unnecessary electrostatic latent image. Then, there is a possibility of lowering resolution of the image formed on the photosensitive member.

To reduce the above described problems, there is a case where an expensive anti-reflection coating such as a multilayer film and the like is extended on surface of a scanning lens 2. However, since the coating is extremely expensive, the cost of the apparatus is increased.

Hence, in Japanese Utility Model Publication No. H06-035212 and Japanese Patent Publication No. H06-027902, there is disclosed that a light shield plate to shield this reflected light is provided so that the reflected light by the fθ lens does not reach the photosensitive member.

The optical scanning apparatus of the double path type, as shown in FIG. 3, is an optical scanning apparatus in which the laser beam obliquely comes into a reflecting surface 2F of the rotation polygon mirror 2 in the sub scanning direction (direction orthogonal to the deflecting direction by the rotation polygon mirror). If the incident angle (oblique incident angle α) in the sub scanning direction is made large, an angle made by the laser beam (incident light beam Ri1) traveling to the rotation polygon mirror and the reflected light by the scanning lens 1 becomes large, and it is relatively easy to dispose the light shield plate at a position not to shield the incident light beam Ri1 and the scanning light beam Rs1 but to shield the reflected light alone.

However, when the oblique incident angle α is made large, non-uniformity (pitch non-uniformity P) of the intervals between the scanning lines on the photosensitive member due to eccentricity of the rotation polygon mirror is unpreferably increased. Further, when the oblique incident angle α is made large, the thickness of the optical scanning apparatus is increased, and the entire apparatus become large-sized.

In contrast to this, when the oblique incident angle α is made small, the pitch non-uniformity P of the scanning lines can be controlled, and the thickness of the apparatus can be controlled.

However, when the angle of oblique incident α is made smaller, the area in which the light shield plate can be arranged becomes narrow, and it becomes difficult to arrange the light shield plate at a position where the laser beam necessary for the image formation is not shielded.

Further, in recent years, in the full color image forming apparatuses, the image forming apparatus of a so-called tandem system lining up a plurality of image forming portions has been in widespread use. To reduce a cost of the image forming apparatus of this tandem type, there exists a system (1 BOX type or 2 BOX type and the like) which emits laser beam to a plurality of photosensitive members by one laser scanner unit. In case the laser scanner unit of such 1 BOX type or 2 BOX type adapts the above described double path system, since the number of incident light beams and scanning light beams is increased for one rotation polygon mirror, the area where the light shield plate can be arranged becomes further narrow, and it becomes difficult to arrange the light shield plate at a position where the laser beam necessary for the image formation is not shielded.

SUMMARY OF THE INVENTION

The present invention is provided in view of the above described problems, and an object of the invention is to provide an optical scanning apparatus capable of shielding a reflected light alone from a scanning lens, while controlling the thickness of the apparatus.

Another object of the present invention is to provide an optical scanning apparatus capable of shielding a reflected light alone from a scanning lens, while controlling the thickness of the apparatus in the optical scanning apparatus capable of emitting the laser beam to each of a plurality of surfaces to be scanned.

A further object of the present invention is to provide an optical scanning apparatus, comprising: a light source generating a laser beam; a deflection device to deflect the laser beam generated from the light source; and a scanning lens through which the laser beam deflected by said deflection device passes, wherein after the laser beam passes through said scanning lens, the laser beam generated from said light source is deflected by said deflection device, again passes through said scanning lens, and emits to the surface to be scanned, a light shield plate to shield the reflected light reflected by said scanning lens and traveling to said surface to be scanned is provided at the opposite side to the side where said deflection device is arranged with said scanning lens as a boundary, and wherein, in a case that a distance between said deflection device and said scanning lens is taken as $L_1$ (mm), the distance between said deflection device and said light shield plate is taken as $L_2$ (mm), a thickness of said scanning lens as T (mm), an incident angle in the sub scanning direction of said laser beam to said deflection device as $\alpha$, and a convergent angle of said laser beam as $2\theta$, said light shield plate is arranged within the range of satisfying the following formula:

$$\frac{2\tan(\alpha+\theta)(L_1+T)+0.5}{\tan(\alpha+\theta)+\tan(\alpha-\theta)} < L_2 < \frac{2\tan(\alpha+\theta)L_1-0.5}{\tan(\alpha+\theta)-\tan(\alpha-\theta)}$$

A further object of the present invention is to provide an optical scanning device, comprising a first light source generating a first laser beam, a second light source generating a second laser beam, a deflection device to deflect the first and second laser beams generated from said first and second light sources, and a scanning lens through which the first and second laser beams deflected by said deflection device pass, wherein after both the first and second laser beams generated from said first and second light sources pass through said scanning lens, the first and second laser beams generated from said first and second light sources are deflected by said deflection device, pass through said scanning lens again, and emit toward a first surface to be scanned and a second surface to be scanned, respectively, a light shield plate to shield a reflected light reflected by said scanning lens and traveling to said first or second surfaces to be scanned is provided at the opposite side to the side where said deflection device is arranged with said scanning lens taken as a boundary, wherein in a case that a distance between said deflection device and said scanning lens is taken as $L_1$ (mm), a distance between said deflection device and said light shield plate is taken as $L_2$ (mm), a distance in the sub scanning direction of said first and second laser beams to incident said deflection device as $L_3$ (mm), a thickness of said scanning lens as T (mm), an incident angle in the sub scanning direction of each of said first and second laser beams to said deflection device as $\alpha$, and the convergent angle of each of the first and second laser beams as $2\theta$, said light shield plate is arranged within the range of satisfying the following formula:

$$\frac{L_3}{2\tan\alpha} - 30 < L_2 < \frac{L_3}{2\tan\alpha} + 30 \qquad \text{[Formula 2]}$$

$$\frac{2\tan(\alpha+\theta)(L_1+T)}{\tan(\alpha+\theta)+\tan(\alpha-\theta)} < L_2 < \frac{2\tan(\alpha+\theta)L_1}{\tan(\alpha+\theta)-\tan(\alpha-\theta)} \qquad \text{[Formula 3]}$$

A further object of the present invention is to provide an optical scanning apparatus including a first light source generating a first laser beam, a second light source generating a second laser beam, a deflection device to deflect the first and second laser beams generated from said first and second light sources; and a scanning lens through which the first and second laser beams deflected by said deflection device pass, wherein after both the first and second laser beams generated from said first and second light sources pass through said scanning lens, both the first and second laser beams generated from said first and second light sources are deflected by said deflection device, pass through said scanning lens again, and emit toward a first surface to be scanned and a second surface to be scanned, respectively, wherein said first and second laser beams generated from said first and second light sources and traveling to said deflection device are intersected short of said scanning lens, and at this intersecting position or in the vicinity of the intersecting position, a light shield plate to shield the reflected light reflected by said scanning lens and traveling to said first and second surfaces to be scanned is provided.

A still further object of the present invention will become apparent from reading the following detailed description taken in connection with the accompanying drawings.

DESCRIPTION OF PREFERRED EMBODIMENT

First Embodiment

A first embodiment of the present invention will be described by using the drawings. In describing the embodiment, an image forming apparatus will be described first, and then, an optical scanning apparatus will be described.

(Image Forming Apparatus)

Figure 9:
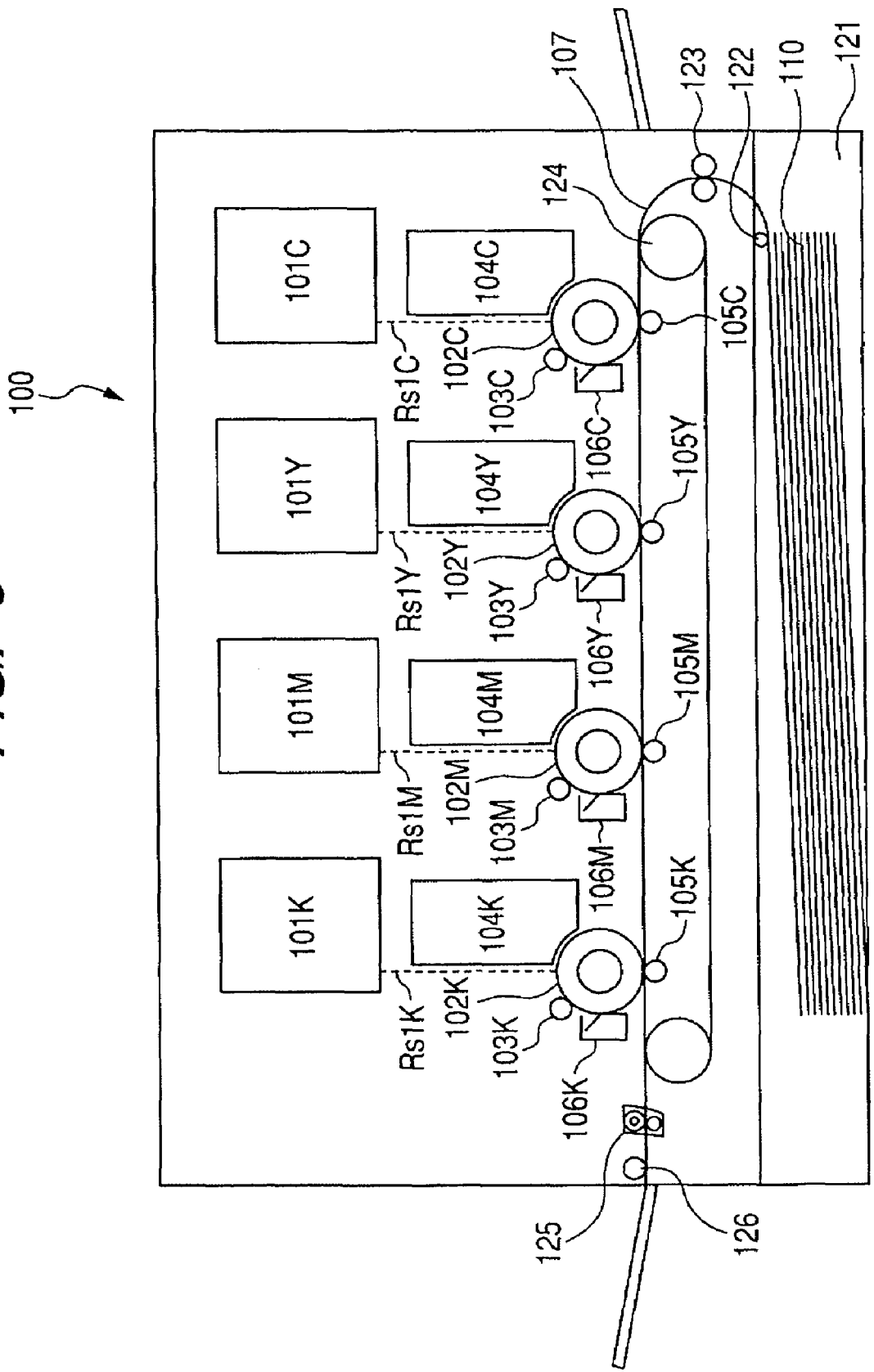
FIG. 9 is an entire schematic explanatory drawing of an image forming apparatus.

First, an image forming apparatus will be described. In the present embodiment, a color image forming apparatus comprising a plurality of image bearing members will be described. FIG. 9 is a schematic explanatory drawing of the image forming apparatus.

As shown in FIG. 9, an image forming apparatus 100 is constituted by an optical scanning apparatus 101 to be described later and another portion (image forming portion). The image forming portion is arranged with a plurality of photosensitive members (image bearing members) 102 (102C, 102Y, 102M and 102K). The four photosensitive members described here correspond to colors to be developed, respectively. That is, cyan corresponds to C, yellow to Y, magenta to M, and black to K.

In the vicinity of the photosensitive member 102, there are arranged a primary charging device 103 (103C, 103Y, 103M, and 103K) uniformly charging the photosensitive member 102, a developing device 104 (104C, 104Y, 104M and 104K) to perform developing by supplying toner to an electrostatic latent image, a transferring member 105 (105C, 105Y, 105M, and 105K) to perform the transferring of an toner image to a transferring material 110 such as a paper and the like from the photosensitive member, and a cleaner 106 (106C, 106Y, 106M, and 106K) to perform the cleaning of a residual toner not transferred but remained. Further, at the position nipped by the photosensitive member 102 and the transferring member 105, a conveyer belt 107 to convey the transferring material 110 is provided so as to be stretched across a driving roller 124 or the like.

Further, at the bottom of the conveyer belt 107, there are provided a tray 121 to mount and hold the transferring material 110 such as a paper and the like, a conveyer roller 122 to let out the transferring material 110 from the tray 121, and a registration roller 123 to supply the transferring material 110 to the conveyer belt 107 with the precise timing while the posture of the transferring material 110 is adjusted. Further, a fixing device 125 to fix the toner image transferred on the transferring material 110 and a discharge roller 126 to discharge the transferring material 110 outside of the apparatus are provided in the downstream of the conveying direction of the transferring material 110 of the conveyer belt 107.

In the above feature, the image forming apparatus forms an image in the following manner. First, the photosensitive member 102 in a state uniformly charged by a primary charging device 103 is irradiated with scanning light beams (laser beam) Rs1C, Rs1Y, Rs1M, and Rs1K from the optical scanning apparatus 101. Since the scanning light beams are optically modulated, respectively based on image information, the electrostatic latent image corresponding to the image information is formed on each of the photosensitive members 102.

The electrostatic latent images are visualized by supplying with the toners of cyan, yellow, magenta, and black by the developing device 104. After that, residual toners remained on the photosensitive member 102 are cleaned by the cleaner 106, and are uniformly charged again by the primary charging device 103 to form the next color image.

On the other hand, the transferring materials 110 stacked on the tray 121 are fed in order one sheet by one sheet by the conveyer roller 122, and are fed on the conveyer belt 107 in synchronization with a writing timing of the image by the registration roller 123. While being accurately conveyed on the conveyer belt 107, a cyan image, a yellow image, a magenta image, and a black image formed on the surface of the photosensitive member 102 are transferred in order on the transferring material 110, thereby forming a color image.

The driving roller 124 accurately performs the feeding of the conveyer belt 107, and is connected with a driving motor (not shown) having few rotational non-uniformity. The color image formed on the transferring material 110 is heat-fixed by the fixing device 125, and after that, is conveyed by a discharge roller 126 or the like so as to output it outside of the apparatus.

(Optical Scanning Apparatus)

Figure 8:
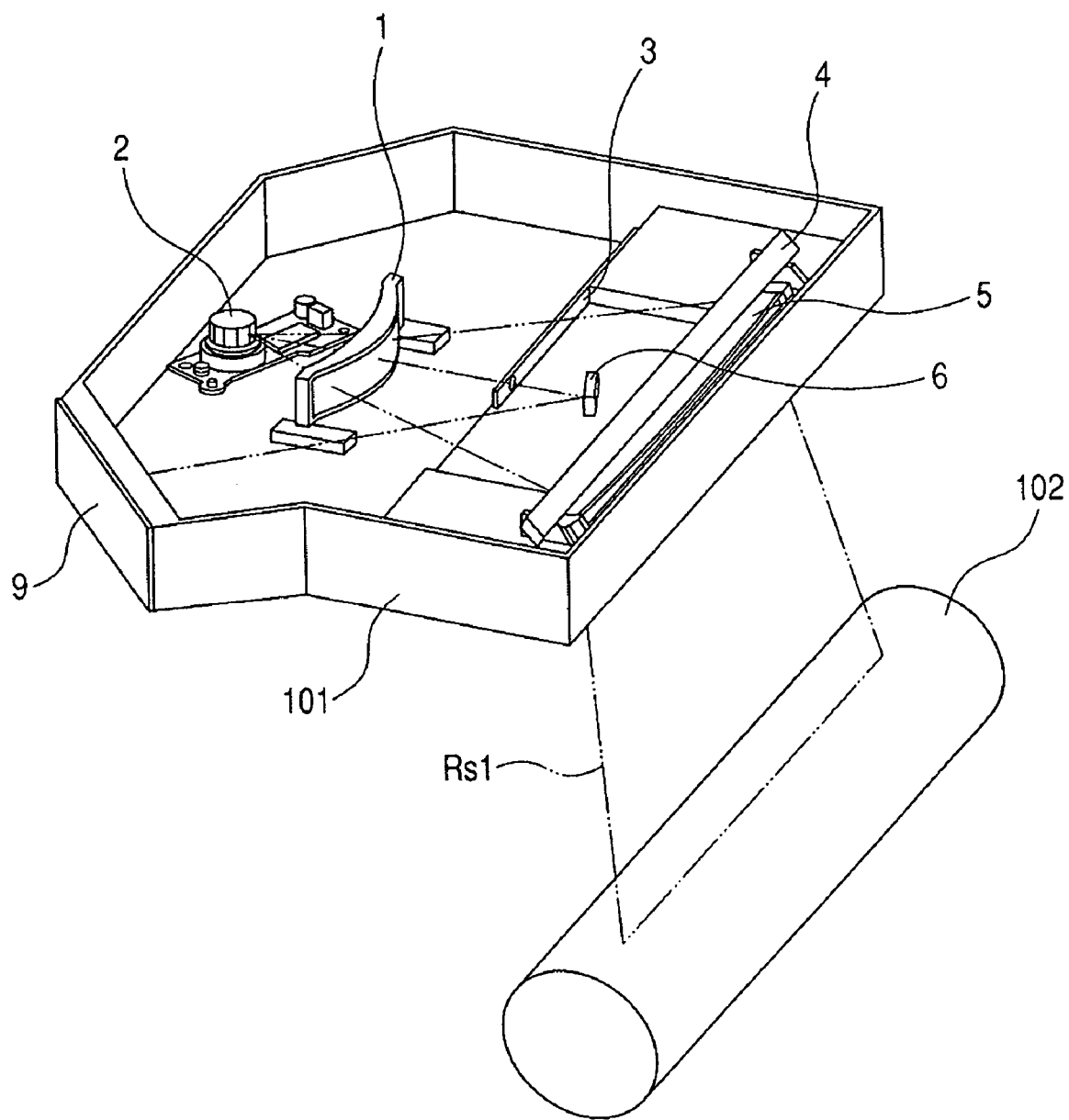
FIG. 8 is a perspective view of the optical scanning apparatus of the first embodiment.

Next, the entire constitution of the optical scanning apparatus will be described. FIG. 8 is an explanatory drawing of the optical scanning apparatus of the present invention.

As shown in FIG. 8, the optical scanning apparatus 101 of the present embodiment includes a light source 9 (only a driving substrate of the light source 9 is shown in FIG. 8) to generate the light beam (laser beam), a mirror 6 to turn back the light beam emitted from the light source, a first scanning lens 1 through which the light beam emitted from the light source passes as incident light beams, a rotation polygon mirror 2 to deflect the incident light beam, a reflecting mirror 4 to reflect and guide the scanning light beam deflected by the rotation polygon mirror 2 in the direction of the photosensitive member 102, and a second scanning lens 5 arranged on the way from the reflecting mirror 4 to the photosensitive member 102. In this manner, the optical scanning apparatus of the present embodiment has a constitution in which the light beam passes through the first scanning lens 1 twice, and is a so-called double path scanning optical system of an oblique incident and a center incident. Further, a light shield plate 3 is arranged at the opposite side to the side where the rotation polygon mirror 2 is arranged with the first scanning lens 1 as a boundary. The constitution of the light shield plate 3 will be described later.

In the above feature, the light beam emitted from the light source goes through the following route.

Figure 1:
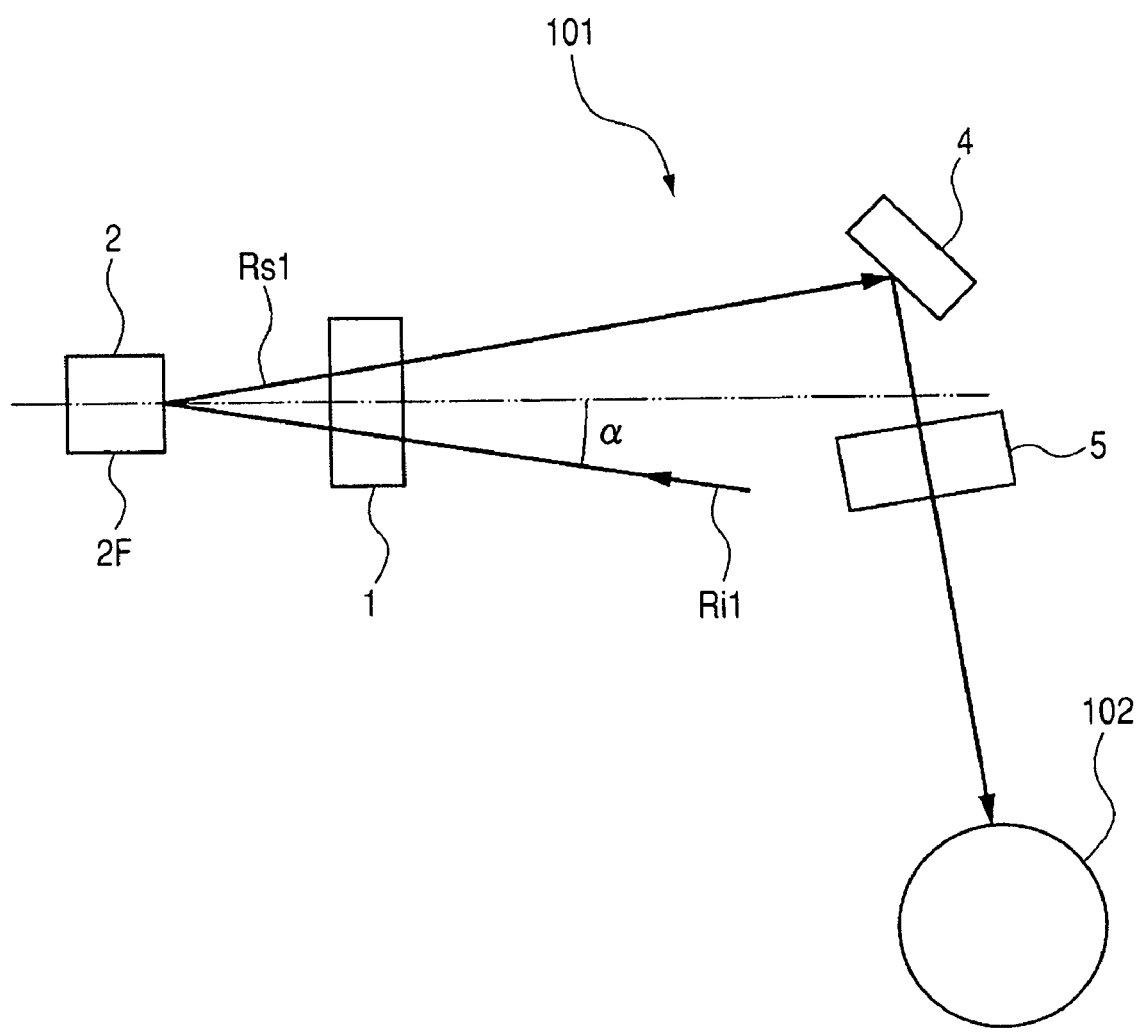
FIG. 1 is a view showing the shape of a light path in an optical scanning apparatus of a first embodiment.

As shown in FIG. 1, the incident light beam Ri1 emitted from the light source and incident the first scanning lens 1 passes through the first scanning lens 1, and after that, reaches the rotation polygon mirror 2 with an incident angle α. The incident light beam Ri1 is reflected (deflected) by a reflecting surface 2F of the rotation polygon mirror 2, and becomes a scanning light beam Rs1. The scanning light beam Rs1 incident the first scanning lens 1 again, passes through the first scanning lens 1, is reflected by a reflecting mirror 4, passes through a second scanning lens 5 and is guided to the photosensitive member 102.

A case where the incident light beam Ri1 is reflected in the surface of the first scanning lens 1 will be described by referring to FIG. 2. Here, from among the surfaces of the first scanning lens 1, the surface at the side where the light source, the reflecting mirror 4, and like exist is taken as a first surface 1F1, and the surface at the side where the rotation polygon mirror 2 exists is taken as a second surface 1F2, and based on this description, the following will be described.

Figure 2:
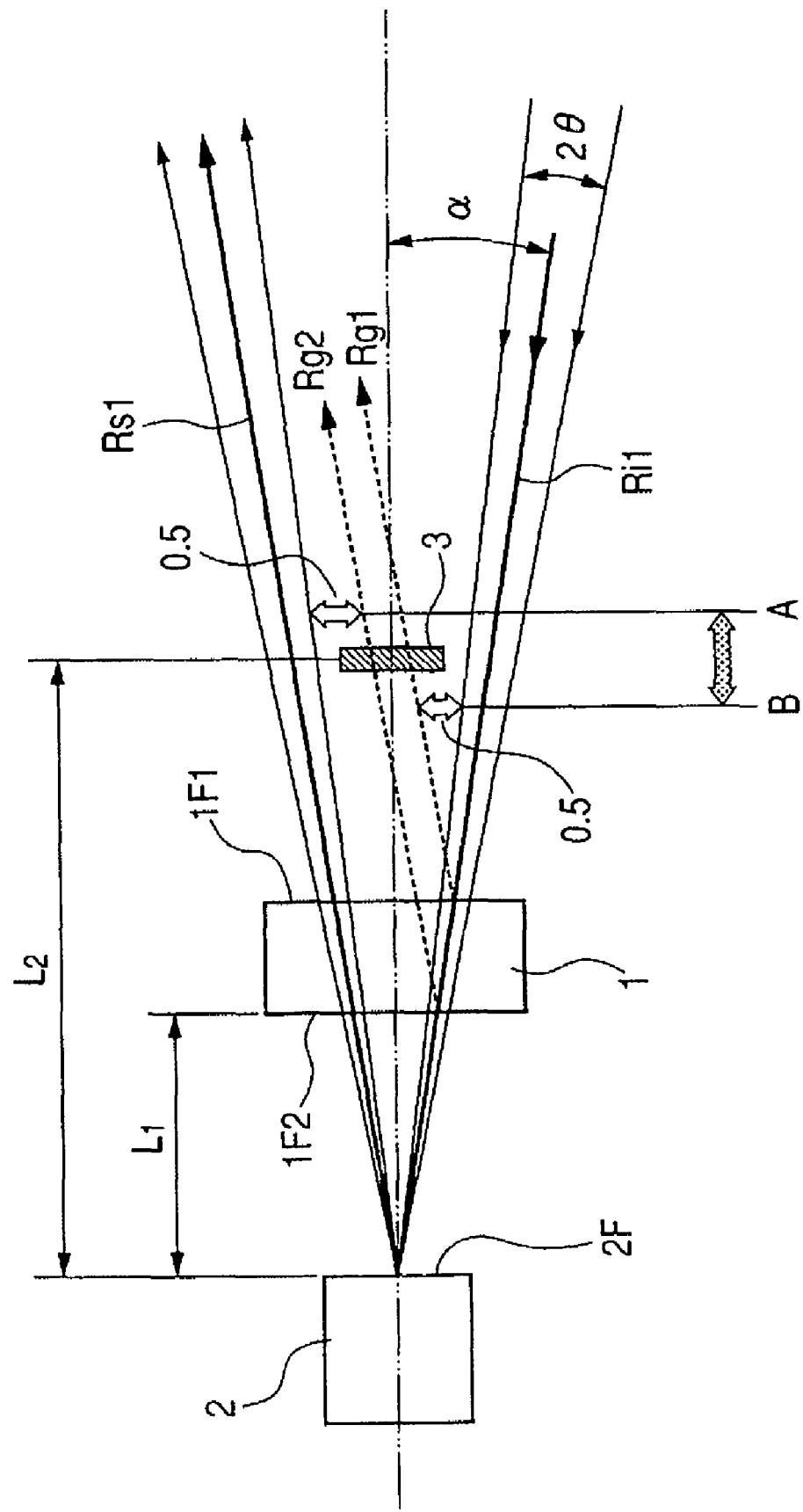
FIG. 2 is a view to explain an installation area of a light shield plate of the optical scanning apparatus of the first embodiment.

As shown in FIG. 2, when the incident light beam Ri1 incident the first surface 1F1 of the first scanning lens 1, a reflected light (a ghost light forming a ghost on the photosensitive member 102) Rg1 reflected approximately at the same angle as the incident angle of the incident light beam Ri1 is generated in the first surface 1F1 of the first scanning lens 1. Similarly, when the incident light beam Ri1 emits from a second surface 1F2 of the first scanning lens 1, a reflected light Rg2 reflected at the side of the reflecting mirror 4 at the second surface 1F2 of the first scanning lens 1 is generated.

Here, since the reflected lights Rg1 and Rg2 are the lights which are reflected before deflected by the rotation polygon mirror 2, the reflected light Rg1 constantly traces on the same light path approximately after the reflected light Rg1 reflects, and the reflected light Rg2 also constantly traces the same light path approximately after the reflected light Rg2 reflects. Then, as a result, on the same position in the center vicinity of the photosensitive member 102, the reflected lights Rg1 and Rg2 are irradiated. In this manner, an electrostatic latent image different from the image to be primarily obtained is formed on the photosensitive member 102. (On the position where the light shield plate 3 is arranged)

In the present embodiment, by providing the light shield plate 3 to shield the reflected lights Rg1 and Rg2, the electrostatic latent image different from the image primarily to be obtained is prevented from being formed on the photosensitive member 102. The condition regarding the position to install the light shield plate 3 will be described in detail.

First, the light shield plate 3 is required to shield the reflected lights Rg1 and Rg2 without shielding the incident light beam Ri1 and the scanning light beam Rs1. Here, in the present embodiment, the incident light beam Ri1 has the angle range of a convergent angle 2θ' in the sub scanning direction (direction orthogonal to the main scanning direction). Further, the scanning light beam Rs1 has also the angle range as a divergent angle 2θ in the sub scanning direction. Hence, the light shield plate 3 has to be placed at a position where the angle ranges of a convergent angle 2θ' and a divergent angle 2θ'' do not overlap.

Further, the double path scanning optical system is an oblique incident optical system, in which the incident light beam Ri1 incident the reflecting surface 2F of the rotation polygon mirror 2 at an angle α. Hence, if the incident angle α is made small, the width in the vertical direction in FIG. 2 becomes small, and it is advantageous for the miniaturization of the apparatus. Consequently, considering the miniaturization of the apparatus, smaller incident angle α to the rotation polygon mirror 2 of the incident light beam Ri1 is more preferable.

Figure 3:
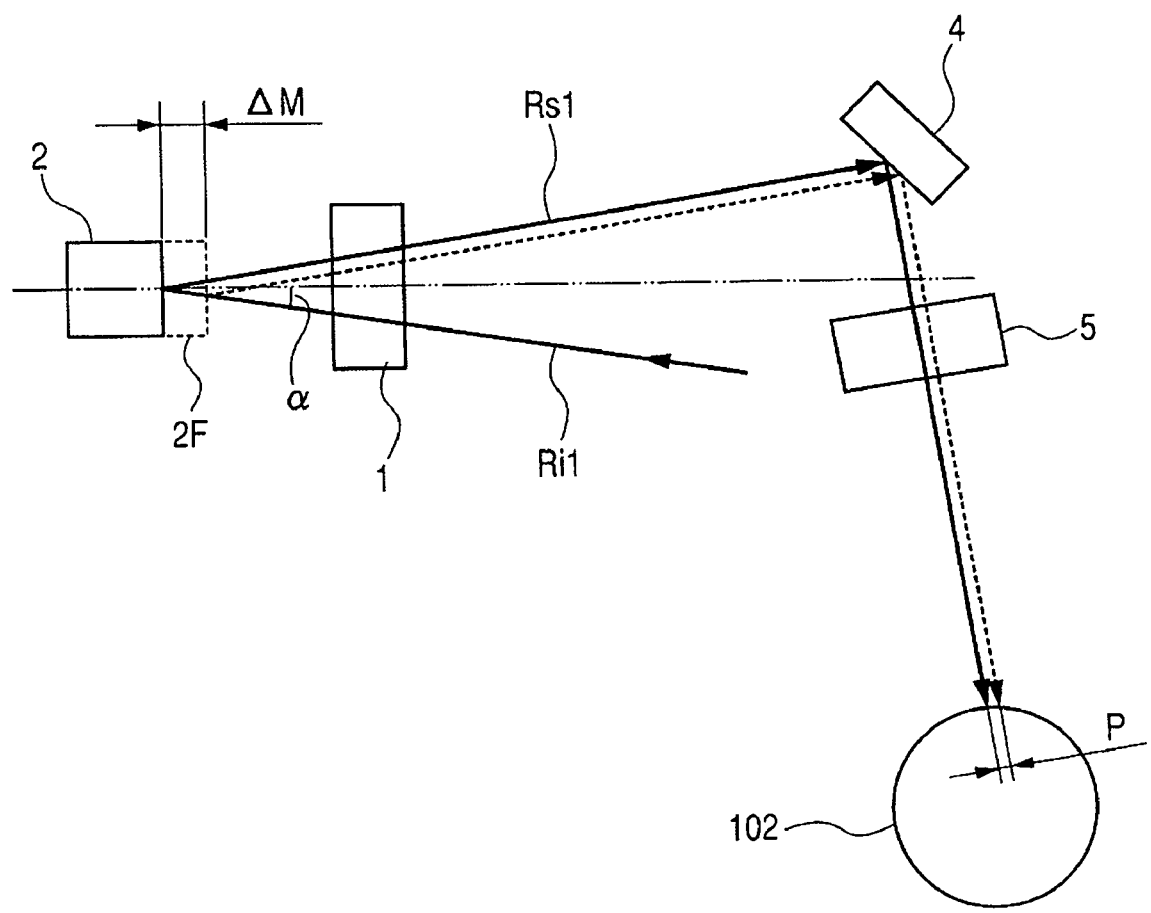
FIG. 3 is a view to explain pitch non-uniformity by a surface eccentricity of a rotation polygon mirror in an oblique incident optical system.

Further, as shown in FIG. 3, in the case of the oblique incident optical system, there is a case where a so-called pitch non-uniformity P is generated by the surface eccentricity ΔM of the rotation polygon mirror 2. The pitch non-uniformity P means that the position of the scanning light beam irradiated on the photosensitive member 102 shifts in the sub scanning direction for each surface of the rotation polygon mirror. To reduce this pitch non-uniformity P, there is a method of either reducing the surface eccentricity ΔM of the rotation polygon mirror 2 or reducing the incident angle α. Here, the surface eccentricity ΔM of the rotation polygon mirror 2, when considering a manufacturing ceiling, has approximately 10 μm left, and therefore, it is preferable to make the pitch non-uniformity P small by setting up the incident angle α small. Consequently, if the incident angle α is made small, it is not only advantageous for the miniaturization of the apparatus, but also advantageous for the control of the pitch non-uniformity.

However, when the incident angle α is made small, since a space between the incident light beam Ri1 and the scanning light beam Rs1 becomes narrow, it is necessary to set up a position of the light shield plate more accurately so that the incident light beam Ri1 and the scanning light beam Rs1 are not shielded.

Further, as can be understood by referring to FIG. 2, if the light shield plate 3 is drawn too close to the scanning lens 1, there is a possibility that the incident light beam Ri1 is shielded. On the other hand, since the scanning light beam Rs1 has the divergent angle 2θ, if the light shield plate 3 is alienated from the scanning lens 1 too far away, there is a possibility that the scanning light beam Rs1 is shielded.

Hence, in the present embodiment, while the light shield plate 3 shields the reflected lights Rg1 and Rg2, the position of the light shield plate 3 is set up so as not to shield the incident light beam Ri1 and the scanning light beam Rs1. In FIG. 2, the position is set in the range of a line A and a line B.

First, to obtain the condition of the line A, the position of the reflected light Rg2 is calculated. Assuming that the distance between the rotation polygon mirror 2 and the first scanning lens 1 is defined as $L_1$ (mm), the distance between the rotation polygon mirror and the light shield plate is defined as $L_2$ (mm), the incident angle to the first scanning lens 1 of the incident light beam Ri1 is defined as α, and the convergent angle of the light beam is defined as 2θ (in this case, the emitting angle of the scanning light beam Rs1 becomes α, and the divergent angle becomes 2θ).

In FIG. 2, in case the laser beam incident position on the rotation polygon mirror 2 is defined as a reference (two-dot chain line of FIG. 2) in the sub scanning direction and the upper side than the reference line is defined as plus and the lower side as minus, the position (the height in the sub scanning direction) where the incident light beam Ri1 reflects on the surface 1F2 at the side opposing to the rotation polygon mirror 2 of the first scanning lens 1 can be expressed by $-L_1 \tan(\alpha+\theta)$ Further, the height in the sub scanning direction of the reflected light Rg2 with the position with regard to a reference where the reflected light Rg2 reflects on the surface 1F2 at the side opposing to the rotation polygon mirror 2 of the first scanning lens 1 can be expressed by $(L_2-L_1)\tan(\alpha+\theta)$ Consequently, the following formula shows the height of the reflected light Rg2 with the two-dot chain line of FIG. 2 defined as a reference.

$-L_1 \tan(\alpha+\theta)+(L_2-L_1)\tan(\alpha+\theta)=(L_2-2L_1)\tan(\alpha+\theta)$ On the other hand, the position of the scanning light beam Rs1 can be expressed by $L_2 \tan(\alpha-\theta)$ Hence, the conditional formula of the relationship where the light path range of the scanning light beam Rs1 and the light path range of the reflected light Rg2 are not overlapped can be expressed by $(L_2-2L_1)\tan(\alpha+\theta)<L_2 \tan(\alpha-\theta)$ In the meantime, when considering the effect of usage environment and the manufacturing tolerance of the apparatus, it was found that a margin of 0.5 mm in the sub scanning direction is required between the scanning light beam Rs1 and the reflected light Rg2. Hence, considering this margin, the conditional formula (1) where the light path range of the scanning light beam Rs1 and the light path range of the reflected light Rg2 are not overlapped becomes as follows.

$(L_2-2L_1)\tan(\alpha+\theta)<L_2 \tan(\alpha-\theta)-0.5$  (1)

Similarly, to obtain the condition of the line B, the height in the sub scanning direction of the reflected light Rg1 with the two-dot chain line defined as a reference can be expressed as follows provided that the thickness in the optical axis direction of the first scanning lens is taken as T.

$-(L_1+T)\tan(\alpha+\theta)+\{L_2-(L_1+T)\}\tan(\alpha+\theta)=\{L_2-2(L_1+T)\}\tan(\alpha+\theta)$ Note that, in the case of the present embodiment, since the optical axis of the incident light beam Ri1 and the optical axis of the first scanning lens 1 are corresponded in the main scanning direction, the thickness T (mm) of the lens is the thickness (thickness approximately in the center of the main scanning direction) in the optical axis direction of the first scanning lens 1, but a case is also conceivable where the optical axis of the incident light beam Ri1 and the optical axis of the first scanning lens 1 are slightly shifted in the main scanning direction. Consequently, considering both cases where the optical axis of the incident light beam Ri1 and the optical axis of the first scanning lens 1 are agreed in the main scanning direction and the optical axis of the incident light beam Ri1 and the optical axis of the first scanning lens 1 are slightly shifted, the thickness T (mm) can be defined as the thickness in the optical axis direction of the incident light beam Ri1 in the main scanning direction.

Further, the position of the incident light beam Ri1 can be expressed as follows.

$-L_2 \tan(\alpha-\theta)$

Hence, the conditional formula wherein the light path range of the incident light beam Ri1 and the light path range of the reflected light Rg1 do not overlapped is defined as follows.

$-L_2 \tan(\alpha-\theta)<\{L_2-2(L_1+T)\}\tan(\alpha+\theta)$

In the meantime, considering the effect of usage environment and the manufacturing tolerance of the apparatus, a margin of 0.5 mm in the sub scanning direction is also required between the incident light beam Ri1 and the reflected light Rg1. Hence, considering this margin, the conditional formula (2) where the light path range of the incident light beam Ri1 and the light path range of the reflected light Rg1 do not overlapped is defined as follows.

$-L_2 \tan(\alpha-\theta)+0.5<\{L_2-2(L_1+T)\}\tan(\alpha+\theta)$  (2)

Summing up the conditional formulas (1) and (2), it is preferable that the reflecting plate is arranged in the range of satisfying the following [formula 1] (within the range between the line A and the line B shown in FIG. 2) so as to shield the reflected lights Rg1 and Rg2.

$$\frac{2\tan(\alpha+\theta)(L_1+T)+0.5}{\tan(\alpha+\theta)+\tan(\alpha+\theta)} < L_2 < \frac{2\tan(\alpha+\theta)L_1-0.5}{\tan(\alpha+\theta)-\tan(\alpha-\theta)} \quad \text{[Formula 1]}$$

As described above, if the light shield plate 3 is arranged in the range of satisfying the [formula 1], since the light shield plate 3 is arranged at a place separated from the incident light beam Ri1 and the scanning light beam Rs1 in the sub scanning direction, the reflected lights Rg1 and Rg2 are reliably shielded without shielding the incident light beam Ri1 and the scanning light beam Rs1. Further, even if the incident angle α is set small, since the place becomes a position capable of shielding the reflected lights Rg1 and Rg2 without shielding the incident light beam Ri1 and the scanning light beam Rs1, an attempt can be made to miniaturize the apparatus, and at the same time, a good image having few pitch non-uniformity P can be obtained.

Second Embodiment

Figure 4:
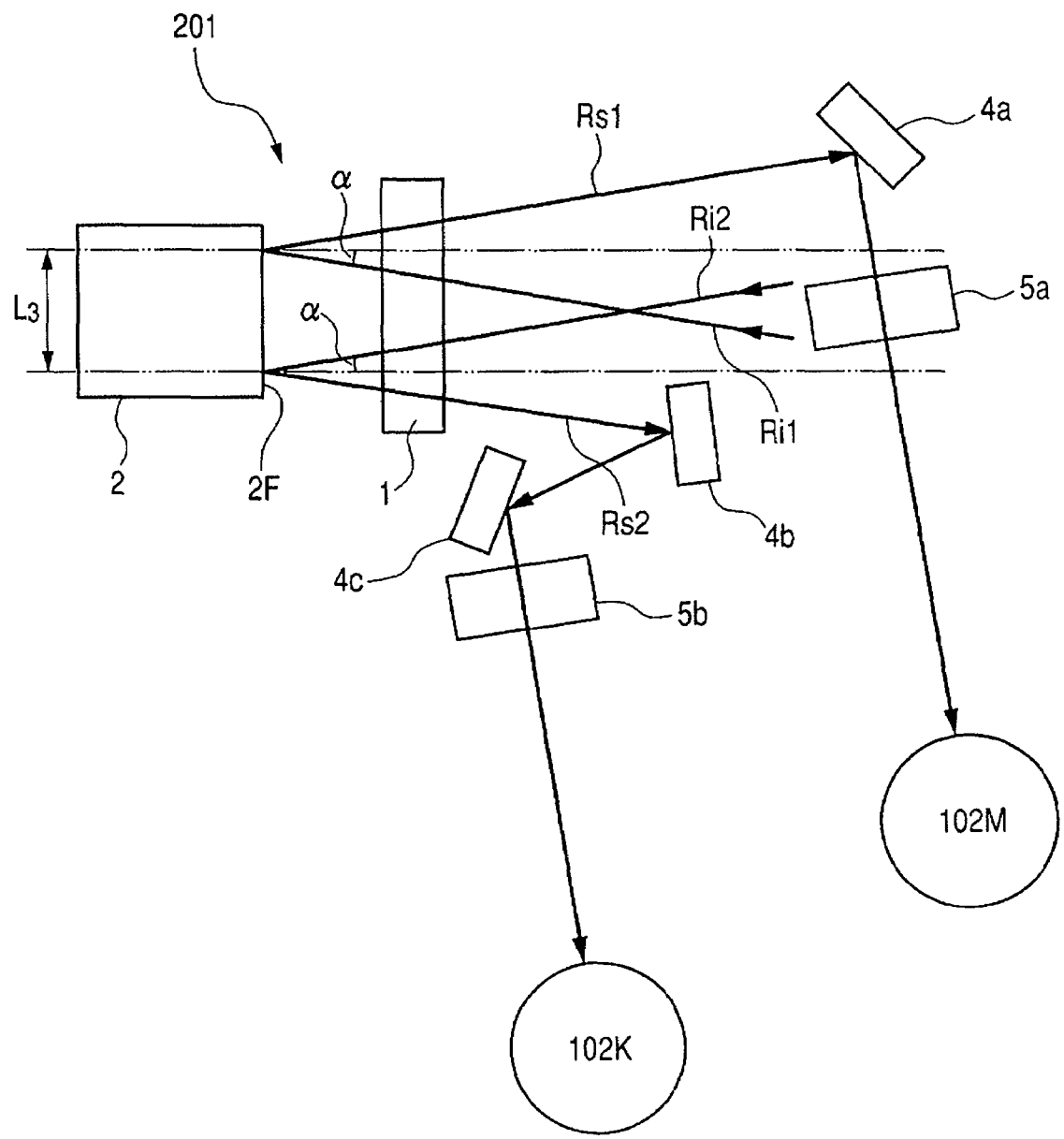
FIG. 4 is a view showing the shape of the light path of the optical scanning apparatus of a second embodiment.
Figure 5:
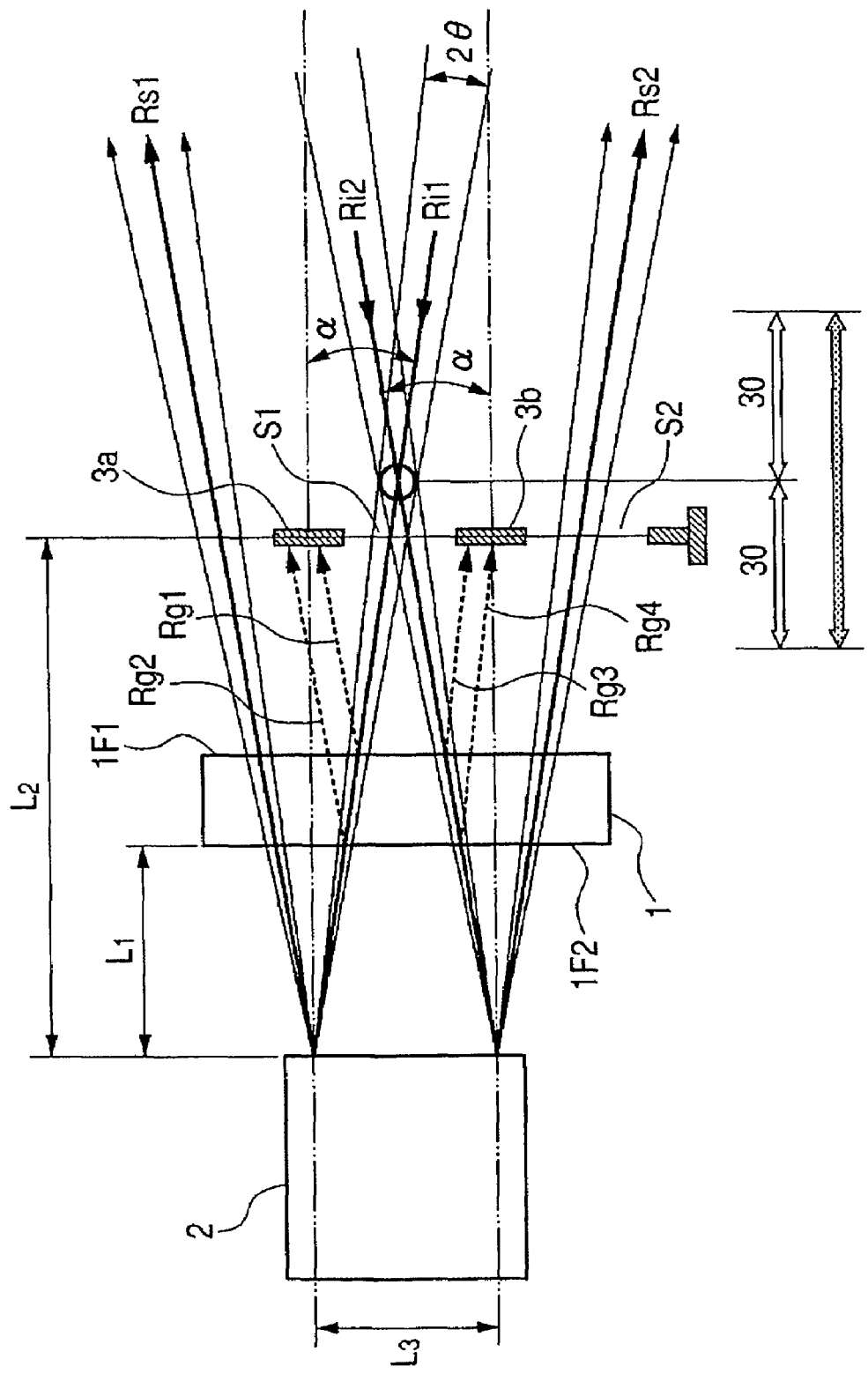
FIG. 5 is a view to explain the installation area of the light shield plate of the optical scanning apparatus of the second embodiment.

A second embodiment of the present invention will be described by using FIG. 4 and FIG. 5. A description on the same constitution as described above will be omitted.

(Optical Scanning Apparatus)

The optical system of the present embodiment is also an optical scanning apparatus 201 of the double path scanning optical system. The optical scanning apparatus 201 of the present embodiment can irradiate scanning beams to two photosensitive members 102 from one laser scanner unit. Consequently, in case an image forming apparatus has four photosensitive members, two laser scanner units of the present embodiment may be mounted.

In the present embodiment, the light beam emitted from the light source traces the following route. As shown in FIG. 4, in the optical scanning apparatus 201, the light beams (incident light beams Ri1 and Ri2) emitted from a plurality of light sources incident on the same surface of a single rotation polygon mirror 2 with the interval of $L_3$ (mm) in the sub scanning direction. The incident light beams Ri1 and Ri2 are deflected in a reflecting surface 2F of the rotation polygon mirror 2, and becomes scanning light beams Rs1 and Rs2 (when expressed by corresponding to FIG. 9, Rs1=Rs1M, and Rs2=Rs1K). The plurality of scanning light beams Rs1 and Rs2 are reflected by reflecting mirrors 4 (4a, 4b, and 4c), and pass through the second scanning lenses 5 (5a and 5b), and are guided in the direction of the photosensitive members 102M and 102K. Note that, in FIG. 4, while a description has been made only on the photosensitive members 102M and 102K, the photosensitive members 102Y and 102C are also irradiated with the scanning light beams from the optical scanning apparatus having the same constitution. In this manner, the constitution where the optical scanning apparatus (laser scanner unit) can manage with two units for four photosensitive members is referred to as the optical scanning apparatus of a 2 BOX type.

In the present embodiment also, it is preferable that the incident angle $\alpha$ is small similarly to the first embodiment. Particularly, in the present embodiment, since a plurality of light beams are allowed to incident with the interval of $L_3$ (mm) in the sub scanning direction, it is necessary to secure a height by the distance of $L_3$ (mm). Hence, to reduce the height of the apparatus, it is preferable to reduce the angle $\alpha$ as much as possible.

A reflected light (ghost light) generated by the reflection of the incident light beams Ri1 and Ri2 on the surface of the first scanning lens 1 will be described. As shown in FIG. 5, similarly to the first embodiment, when the incident light beam Ri1 incident the first surface 1F1 of the first scanning lens 1, the reflected light Rg1 is generated, and when the incident light beam Ri1 is emitted from the second surface 1F2 of the first scanning lens 1, the reflected light beam Rg2 is generated. Similarly, when the incident light beam Ri2 incident on the first scanning lens 1, the reflected light Rg3 is generated, and when emitting from the first scanning lens 1, the reflected light Rg4 is generated.

Figure 10:
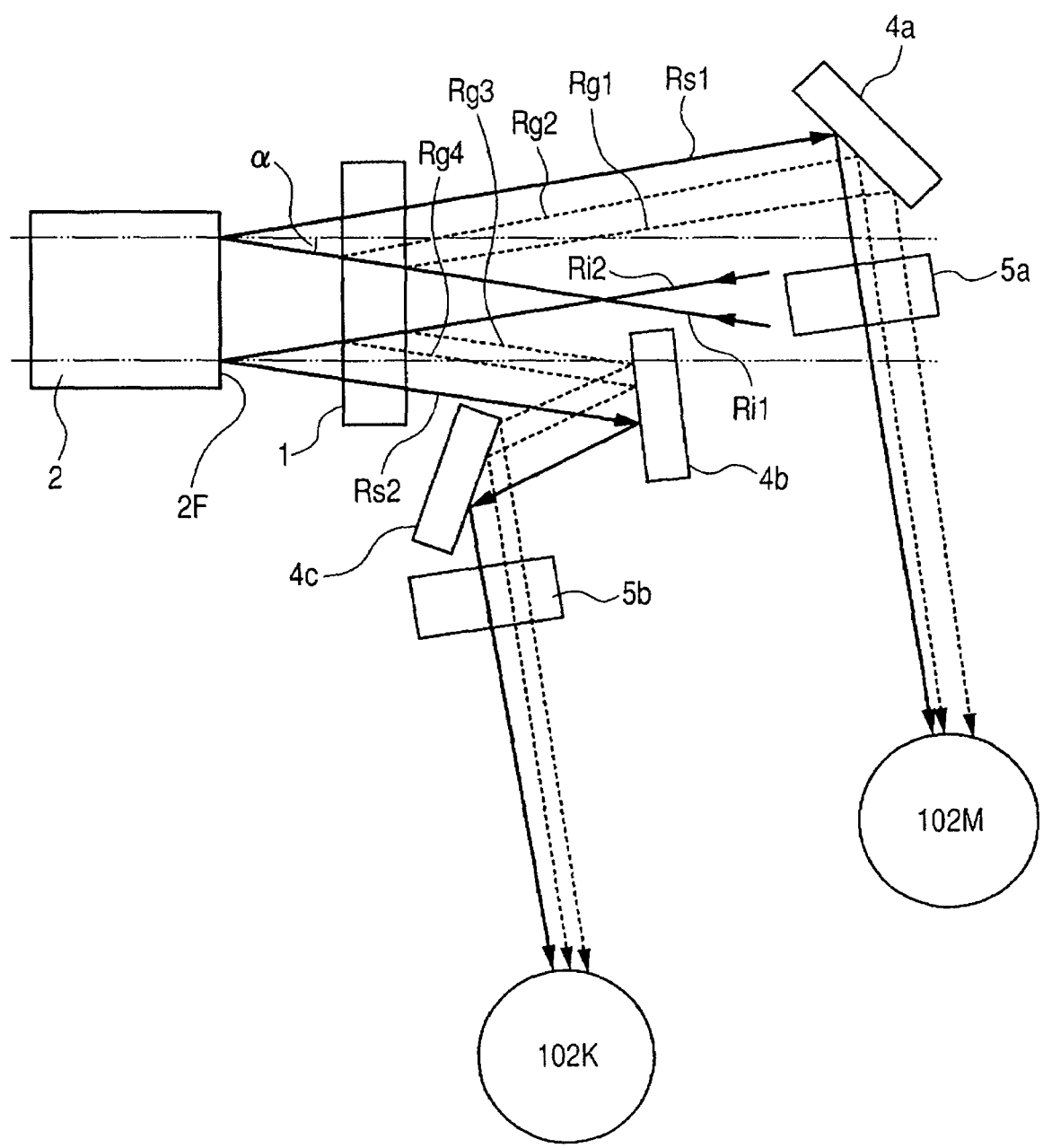
FIG. 10 is a view showing a state in which a reflected light from the scanning lens reaches a photosensitive member in the optical scanning apparatus of 2 BOX type.
Figure 11:
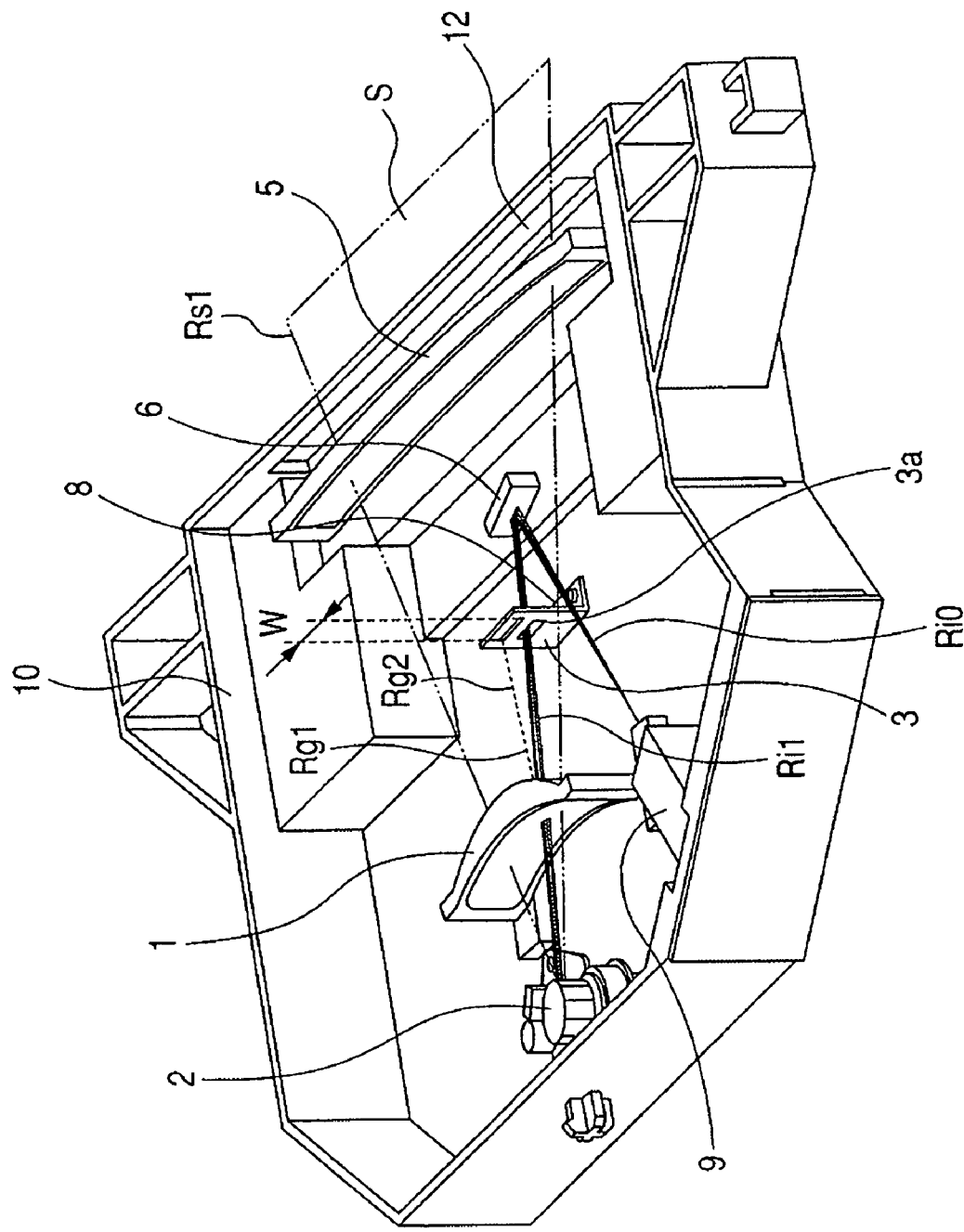
FIG. 11 is a perspective view of the optical scanning apparatus of a fifth embodiment.

The reflected lights Rg1, Rg2, Rg3, and Rg4 are generated before the incident light beams Ri1 and Ri2 are deflected by the rotation polygon mirror 2. Hence, for the same reason as the previous embodiment, an electrostatic latent image different from the image primarily to be obtained is formed on the photosensitive member 102. In FIG. 10, the state in which the reflected lights Rg1, Rg2, Rg3, and Rg4 reach until the photosensitive members 102M and 102K is shown.

(On the Position where the Light Shield Plate 3 is Arranged)

In the present embodiment, by providing the light shield plates 3 (3a and 3b) to shield the reflected lights Rg1, Rg2, Rg3, and Rg4, the generation of the electrostatic latent image different from the image primarily to be obtained is prevented from being formed on the photosensitive member 102. The condition regarding the position to install the light shield plate 3 will be described in detail.

First, the light shield plate 3 is required to shield the reflected lights Rg1, Rg2, Rg3, and Rg4 without shielding the incident light beams Ri1 and Ri2 and the scanning light beam Rs1 and Rs2. Here, in the present embodiment, the incident light beams Ri1 and Ri2 have the angle range of a convergent angle $2\theta'$ in the sub scanning direction. Further, the scanning light beam Rs1 and Rs2 have also the angle range of a divergent angle $2\theta'$ in the sub scanning direction. Hence, the light shield plate 3 has to be placed at a position wherein the angle ranges of the convergent angle $2\theta$ and the divergent angle $2\theta''$ do not overlap with each other.

Considering the above described conditions, regardless of setting up of the incident angle $\alpha$, the most suitable position of the light shield plate is shown in the following [Formula 2] and [Formula 3]. Here, the distance $L_2$ (mm) is a distance in the vertical direction to the reflecting surface 2F (on the two-dot chain lines in the Figure) with the positions incoming with the incident light beams Ri1 and Ri2 taken as a reference in the reflecting surface 2F of the rotation polygon mirror 2. The light shield plate 3 is arranged in the range of satisfying both of the following [Formula 2] and [formula 3]. Note that arranged in this range are the portions 3a and 3b of FIG. 5 of the light shield plate 3.

$$\frac{L_3}{2\tan\alpha} - 30 < L_2 < \frac{L_3}{2\tan\alpha} + 30 \quad \text{[Formula 2]}$$

$$\frac{2\tan(\alpha+\theta)(L_1+T)}{\tan(\alpha+\theta)+\tan(\alpha-\theta)} < L_2 < \frac{2\tan(\alpha+\theta)L_1}{\tan(\alpha+\theta)-\tan(\alpha-\theta)} \quad \text{[Formula 3]}$$

In the [Formula 2] and [Formula 3], the distance between the rotation polygon mirror 2 and the first scanning lens 1 is defined as $L_1$ (mm) the incident angle in the sub scanning direction to the rotation incident light beams Ri1 and Ri2 is respectively defined as $\alpha$, the convergent angle of each of the light beams is defined as $2\theta$, and incoming intervals of a plurality of light beams (distance in the sub scanning direction on the reflecting surface 2F of the rotation polygon mirror 2) is defined as $L_3$ (mm).

The [formula 2] represents the vicinity of the position where the incident light beams Ri1 and Ri2 intersect before incident the first scanning lens 1. In a region in which the incident light beams Ri1 and Ri2 intersects with each other, the area occupied by two incident light beams Ri1 and Ri2 becomes the smallest. Hence, it is easy to shield the reflected lights. Assuming that the distance from the reflecting surface of the rotation polygon mirror to the position where the incident light beams Ri1 and Ri2 intersect is defined as Lx (mm), since the height of the position where the incident light beams Ri1 and Ri2 intersect with one piece defined as a reference from among two pieces of the two-dot chain lines shown in FIG. 5 can be expressed as Lx tan $\alpha$, and therefore, it becomes as follows.

$$2Lx \tan \alpha = L_3,$$

$$Lx = L_3/2 \tan \alpha$$

In the meantime, when considering the effect of usage environment and the manufacturing tolerance of the apparatus, a margin of ±30 mm in the optical axis direction of the first scanning lens is required as an installing position of the light shield plate for the position where the incident light beams Ri1 and Ri2 intersect. Hence, considering this margin, the range becomes the [Formula 2].

The range of the [Formula 3] will be better understood by referring to the first embodiment. When the portions 3a and 3b of the light shield plate 3 are arranged in the range of satisfying the [Formula 2] and [Formula 3], the ghost light can be reliably shielded. Further, with the angle a made extremely small, a good image having few pitch non-uniformity is obtained, and at the same timed, the miniaturization of the apparatus can be realized.

Further, in case the optical scanning apparatus of the 2 BOX type such as the present embodiment is used for the color image forming apparatus of the tandem type, since a plurality of light beams can be obtained by the single rotation polygon mirror 2, the optical scanning apparatus having few energy consumption of the apparatus can be provided.

The light shield plate 3 mounted by the optical scanning apparatus of the present embodiment is a platy integral part which shields the reflected light in its portions 3a and 3b. The light shield plate 3 is provided with slits S1 and S2 to allow the incident light beams Ri1 and Ri2 and the scanning light beam Rs2 to pass through. In this manner, if the light shield plates to shield the two places are made into an integral member, the number of members is reduced, and therefore, there is an effect of reducing the cost of the light shield plate. Further, having been made into an integral member, one member is sufficient to be mounted on a housing of an apparatus at the mounting time of the light shield plate. Then, a common difference at the mounting time of the light shield plate can be reduced, and the positional accuracy of the light shield plate can be enhanced.

Further, by installing the light shield plate 3 as described above at the position where the incident light beams Ri1 and Ri2 intersect or in the vicinity thereof, a design that shields the reflected light only can be easily worked out without shielding the incident light beams Ri1 and Ri2 and the scanning light beams Rs1 and Rs2. To make it easy to install the light shield plate 3 in this manner, in the present embodiment, the incident light beams Ri1 and Ri2 are intersected, and moreover, its intersecting position is situated short of the scanning lens 1 in the travelling direction of the incident light beam. Note that, in the case of the present embodiment, similarly to the first embodiment, it is more preferable to consider a margin of 0.5 mm in the sub scanning direction between the incident light beam or the scanning light beam and the reflected light. In this case, the [Formula 3] is replaced by the [Formula 1], and the light shield plate may be arranged in the range of satisfying the [Formula 1] and the [Formula 2].

Third Embodiment

A third embodiment of the present invention will be described by using FIG. 6. A description on the same constitution as described above will be omitted by attaching the same reference numerals.

(Optical Scanning Apparatus)

Figure 6:
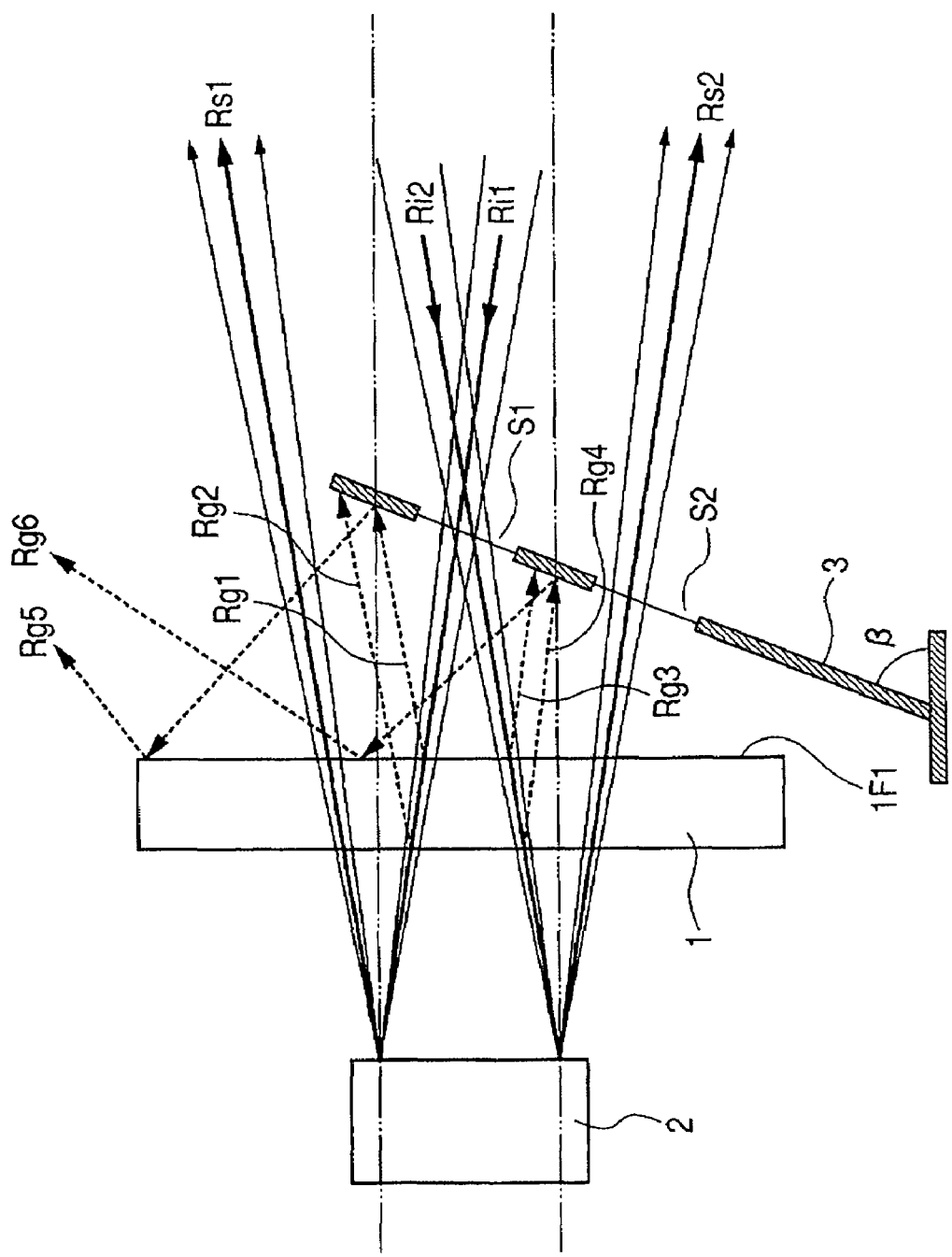
FIG. 6 is a view to explain the constitution in the vicinity of the light shield plate of the optical scanning apparatus of a third embodiment.

In the previous embodiment, while the light shield plate has been provided vertically (parallel with the rotational axis of the rotation polygon mirror) to the optical axis (in the direction of two-dot chain line) of a first scanning lens, a light shield plate 3 of the present embodiment as shown in FIG. 6 makes an angle β made by the optical axis of the first scanning lens and the light shield plate smaller than 90° (non parallel with the rotational axis of the rotation polygon mirror). When the light shield plate 3 is obliquely arranged in this manner to the pivot axis of a deflection device, the reflected lights Rg1, Rg2, Rg3, and Rg4 reflected on the surface of the light shield plate 3 are reflected in the direction such as shown by Rg5 and Rg6 of FIG. 6.

Here, while the reflected lights from the light shield plate are reflected on a first surface 1F1 of the first scanning lens 1, and are turned into re-reflected lights Rg5 and Rg6, as shown in FIG. 6, if the angle β of the light shield plate 3 is set up so as to trace the light path upper than the scanning light beam Rs1, the re-reflected lights Rg5 and Rg6 will not reach the photosensitive member 102, and therefore, unnecessary electrostatic latent image will not be formed on the photosensitive member 102. As a range of this angle β, it is preferable to be in the range of $70° \leq \beta < 90°$. Note that it is also preferable to install the light shield plate of the present embodiment in the range shown in the second embodiment.

Further, as shown in FIG. 6, the light shield plate may be a platy integral part where slits S1 and S2 to allow the incident light beams Ri1 and Ri2 and the scanning light beam Rs2 to pass through are provided.

Fourth Embodiment

A fourth embodiment of the present invention will be described by using FIG. 7. A description on the same constitution as described above will be omitted by attaching the same reference numerals.

(Optical Scanning Apparatus)

Figure 7:
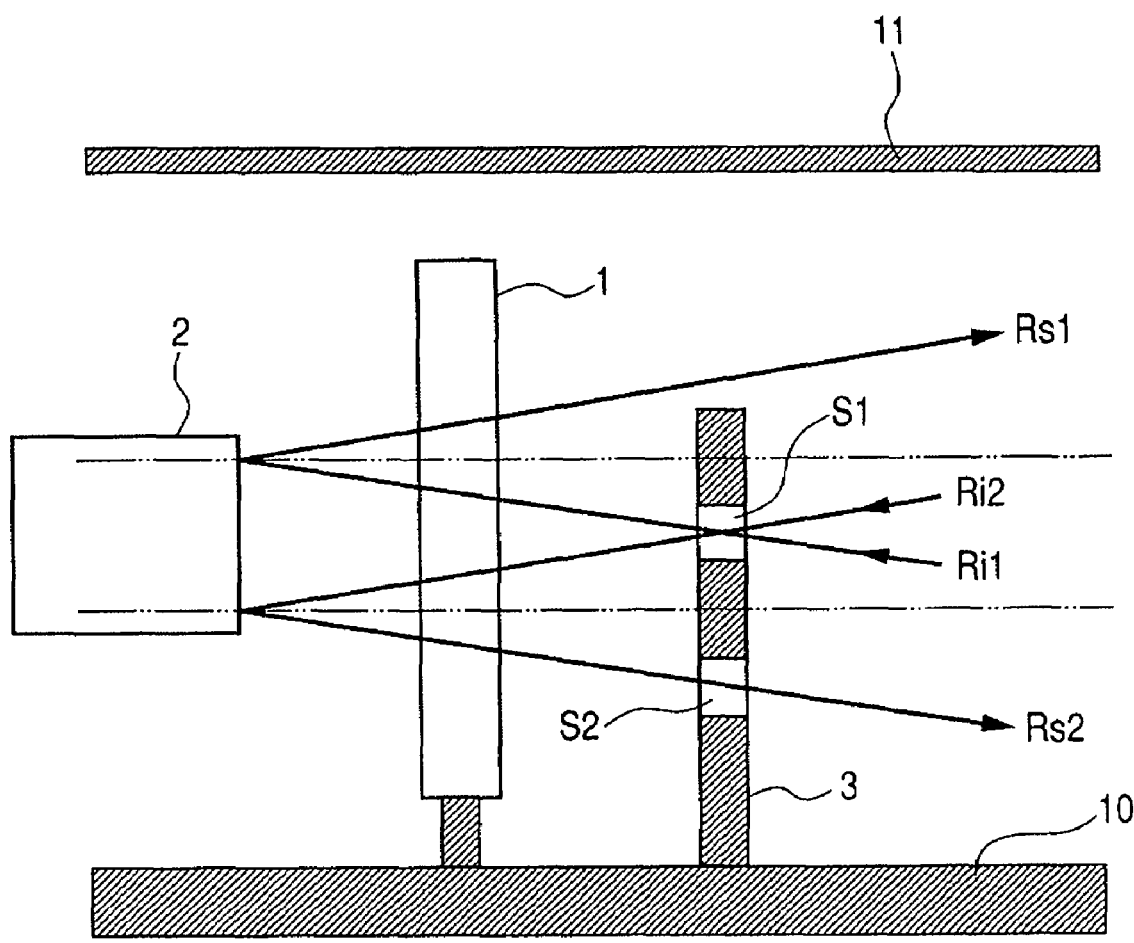
FIG. 7 is a view to explain the constitution in the vicinity of the light shield plate of the optical scanning apparatus of a fourth embodiment.

As shown in FIG. 7, a light shield plate 3 of the present embodiment is integrally formed with a housing 10 (optical box) of the optical scanning apparatus. By providing a slide in the interior of a mold for manufacturing a molded product, slit portions S1 and S2 are formed. In the case of the present embodiment, by integrating the light shield plate 3 and the housing 10 of the optical scanning apparatus, the cost cutting of the light shield plate 3 is realized. In the present embodiment, while the light shield plate 3 and the housing 10 of the optical scanning apparatus are integrated, the light shield plate 3 may be integrated with a lid 11 covering the opening portion of the housing 10 of the optical scanning apparatus. In case the light shield plate 3 and the lid 11 are turned into an integrally molded product, the light shield plate 3 is provided with a slit through which the incident light beams Ri1 and Ri2 pass and a slit through which the scanning light beam Rs1 passes. Note that, in case the present embodiment is adapted to the first embodiment, the slit may be one piece. Further, the light shield plate inclined similarly to the first embodiment may be integrally molded with the housing and the lid of the optical scanning apparatus.

Fifth Embodiment

Next, a fifth embodiment of the present invention will be described. The present embodiment, similarly to the first embodiment, is an optical scanning apparatus to irradiate the laser corresponding to image information to one photosensitive member.

FIG. 10 is a perspective view of an optical scanning apparatus of the present embodiment. Similarly to the first embodiment, the parts having the same function are attached with the same reference numerals. Note that the light beam emitted from a light source 9 until reflected by a mirror 6 is attached with reference numeral Ri0, the light beam reflected by the mirror 6 until deflected by a rotation polygon mirror 2 is attached with reference numeral Ri1, and the light beam after deflected by the rotation polygon mirror 2 is attached with reference numeral Rs1. Reference numerals Rg1 and Rg2 denote reflected lights from a scanning lens 1.

The optical scanning apparatus of the present embodiment, similarly to the first embodiment, is also a double path type in which the laser (light beam) generated from the light source 9 is deflected by the rotation polygon mirror 2 after having passed through a scanning lens 1, and after that, passes through the scanning lens 1 again, and emits to a surface to be scanned (photosensitive member).

The incident light beam Ri0 emitted from the light source 9 until reflected by the mirror 6 incident the mirror 6 at an angle with the optical axis of the first scanning lens 1 in the main scanning direction, and is reflected, and is guided in the direction of the rotation polygon mirror 2 (Ri1). The scanning light beam Rs1 deflected by the rotation polygon mirror 2 and having passed through the first scanning lens 1 passes through a second scanning lens 5 without being reflected by the mirror on the way, and further, emits by passing through a hole 12 provided in an optical box 10. Note that the rotation polygon mirror 2 of the present embodiment has a diameter of 20 mm, and has ten reflecting surfaces, and the width of each surface in the main scanning direction is 5 mm. Further, the width in the main scanning direction of the incident light beam Ri1 having reached the rotation polygon mirror 2 is 8 mm, and is larger than the width of each surface of the rotation polygon mirror 2.

Similarly to the first embodiment, the light shield plate 3 to shield the reflected lights Rg1 and Rg2 from the scanning lens 1 is arranged in the upper stream side (this side) of the first scanning lens 1 in the travelling direction of the incident light beam Ri1. The scanning light beam Rs1 deflected by the rotation polygon mirror 2 passes through over the light shield plate 3. The light shield plate 3 is fastened to an optical housing 10 by screws 8. Further, the light shield plate 3 is provided with a slit 3a allowing the incident light beam Ri1 to pass through.

When the curvature of the first scanning lens 1 is too large, the width in the main scanning direction of the reflected lights Rg1 and Rg2 becomes too large, and therefore, the width in the main scanning direction of the light shield plate 3 must be enlarged. Hence, in the present embodiment, the curvature of the first scanning lens 1 is decided so that the width in the main scanning direction of the reflected lights Rg1 and Rg2 does not become too large. To be specific, the curvature of the first scanning lens 1 is decided so that a width W on the light shield plate 3 of the reflected lights Rg1 and Rg2 becomes narrower than the width in the main scanning direction of the scanning light beam Rs1 at a position of the same distance as the distance from the first scanning lens 1 to the light shield plate 3.

In this manner, the light shield plate 3 is arranged in the upper stream side (this side) of the first scanning lens 1 in the proceeding direction of the an incident light beam Ri1, and this light shield plate 3 is provided with a slit through which the incident light beam Ri1 passes, and therefore, the width of the light shield plate 3 may be made just slightly larger than the width W on the light shield plate 3 of the reflected lights Rg1 and Rg2, and there is a merit of being able to make the light shield plate 3 smaller.

Sixth Embodiment

Next, a sixth embodiment of the present invention will be described. The present embodiment, similarly to the second embodiment, is the optical scanning apparatus of a 2 BOX type to irradiate the laser corresponding to image information to two photosensitive members.

Figure 12:
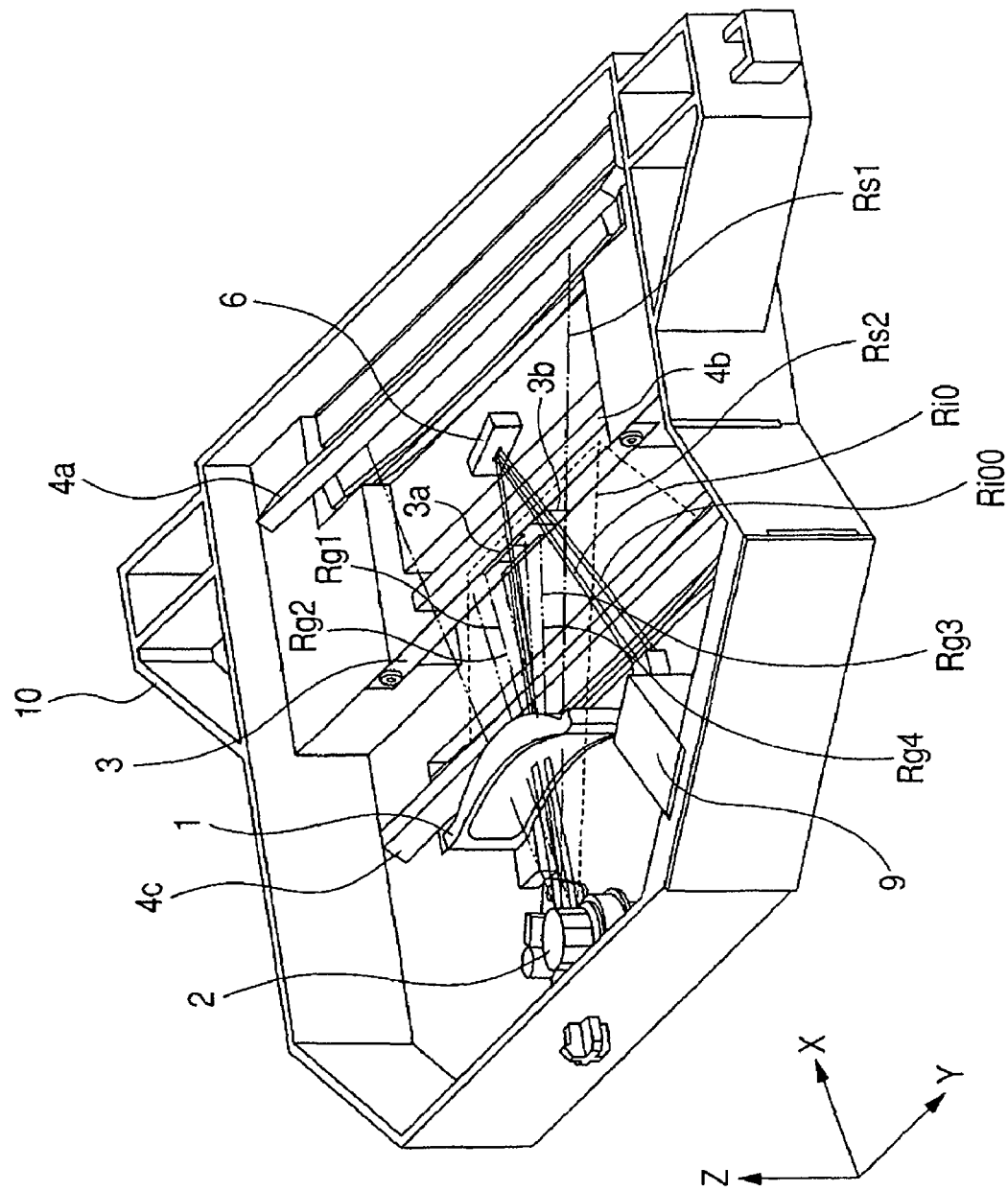
FIG. 12 is a perspective view of the optical scanning apparatus of a sixth embodiment.

FIG. 12 is a perspective view of the optical scanning apparatus of the present embodiment. Since the parts having the same function as the second embodiment in this embodiment, the same reference numerals are used. Further, since the light paths of two lasers until reaching two photosensitive members are also the same as the second embodiments, it is to be referred to FIG. 4. Note that the light beams emitted from a light source 9 until reflected by a mirror 6 are attached with reference numerals Ri0 (first laser) and Ri00 (second laser), the light beams reflected by the mirror 6 until deflected by a rotation polygon mirror 2 are attached with reference numerals Ri1 (first laser) and Ri2 (second laser), and the light beams after deflected by the rotation polygon mirror 2 are attached with reference numerals Rs1 (first laser) and Rs2 (second laser). Reference numerals Rg1, Rg2, Rg3, and Rg4 are reflected lights from the scanning lens 1. The light source unit 9 is provided with a semiconductor laser (first light source) to generate a first laser and a semiconductor laser (second light source) to generate a second laser, and the first light source and the second light source are separated in the sub scanning direction.

The optical scanning apparatus of the present embodiment, similarly to the second embodiment, is also a double path type in which first and second lasers (light beams) emitted from a light source 9 pass through a scanning lens 1, and are deflected by the rotation polygon mirror 2 after having passed through a scanning lens 1, and after that, pass through the scanning lens 1 again, and emit to first and second surfaces to be scanned (photosensitive members).

The incident light beams Ri0 and Ri00 emitted from the light source 9 until reflected by the mirror 6 incident the mirror 6 at an angle with the optical axis of the first scanning lens 1 in the main scanning direction, and are reflected, and are guided in the direction of the rotation polygon mirror 2 (Ri1 and Ri2). The scanning light beam Rs1 deflected by the rotation polygon mirror 2 and having passed through the first scanning lens 1 is reflected by mirror 4a, and after that, passes through a lens 5a, and emits. On the other hand, the scanning light beam Rs2 is reflected by mirrors 4b and 4c, and after that, passes through the lens 5b, and emits. Note that the rotation polygon mirror 2 of the present embodiment has a diameter of 20 mm, and has ten reflecting surfaces, and a width in the scanning direction of each surface is 5 mm. Further, the width in the main scanning direction of the incident light beams Ri1 and Ri2 having reached the rotation polygon mirror 2 is 8 mm, and is larger than the width of each surface of the rotation polygon mirror 2.

Similarly to the second embodiment, the incident light beams Ri1 and Ri2 are intersected in the upper stream side (this side) of the first scanning lens 1 in their traveling directions. Further, the light shield plate 3 to shield the reflected lights Rg1, Rg2, Rg3, and Rg4 from the scanning lens 1 is arranged at the intersecting position of the incident light beams Ri1 and Ri2 or the vicinity of the intersecting position in the traveling directions of the incident light beams Ri1 and Ri2.

The light shield plate 3 of the present embodiment is held by the optical housing by screws at both end portions in the main scanning direction. Further, the light shield plate 3 comprises a slit 3b through which both the incident light beams Ri0 and Ri00 pass, and a slit 3a through which both the incident light beams Ri1 and Ri2 pass. The scanning light beam Rs1 after deflected by the rotation polygon mirror 2 passes through over the light shield plate 3, and the scanning light beam Rs2 after deflected by the rotation polygon mirror 2 passes through under the light shield plate 3.

Figure 13:
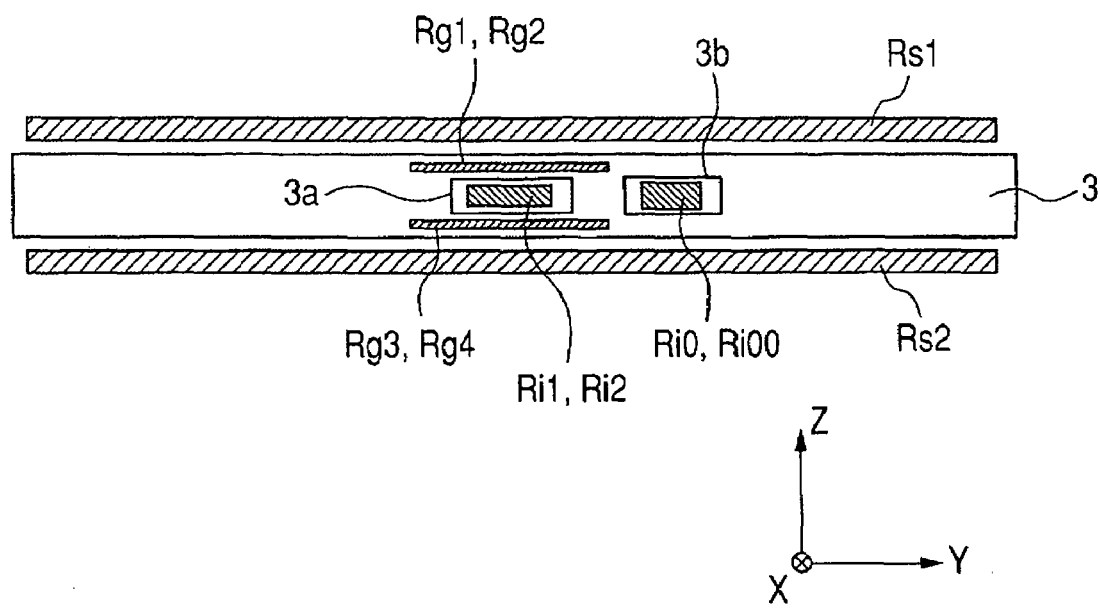
FIG. 13 is a view showing a relationship among the light shield plate used in the sixth embodiment, the pass-through area of an incident light beam, the pass-through area of the scanning light beam, and the irradiating area of the reflected light on the light shield plate.

FIG. 13 is a view of the light shield plate 3 of the optical scanning device shown in FIG. 12 seen from an X direction, which shows a relationship among the area through which the incident light beam and the scanning light beam pass, the area irradiated by the reflected light, and the light shield plate 3.

Since the light shield plate shown in the second to fourth embodiments has one end portion in the sub scanning direction attached to the optical box (or integrally molded with the optical box). Hence, the light shield plate requires a slit S2 through which the scanning light beam Rs2 passes, and the width in the laser main scanning direction of the light shield plate is required to be larger than the pass-through area of the scanning light beam Rs2.

In contrast to this, the light shield plate of the present embodiment is constituted so as to be held at both ends in the main scanning direction by the optical box, and therefore, the two scanning light beams Rs1 and Rs2 can pass through the light shield plate above and below. Hence, the light shield plate needs no slit through which the scanning light beams Rs1 and Rs2 pass, and there is a merit in that it does not matter if the width of the light shield plate in the laser main scanning direction is narrow than the area through which the scanning light beams Rs1 and Rs2 pass.

Seventh Embodiment

A seventh embodiment of the present invention will be described. The present embodiment, similarly to the first and the fifth embodiments, is an optical scanning apparatus to irradiate the laser corresponding to image information to one photosensitive member. However, the number of surfaces of a rotation polygon mirror 2 is not ten, but four, and the width in the main scanning direction of the light beams incident the rotation polygon mirror 2 is narrower than the width in the main scanning direction of one surface of the rotation polygon mirror 2 (under field optical system).

Figure 14:
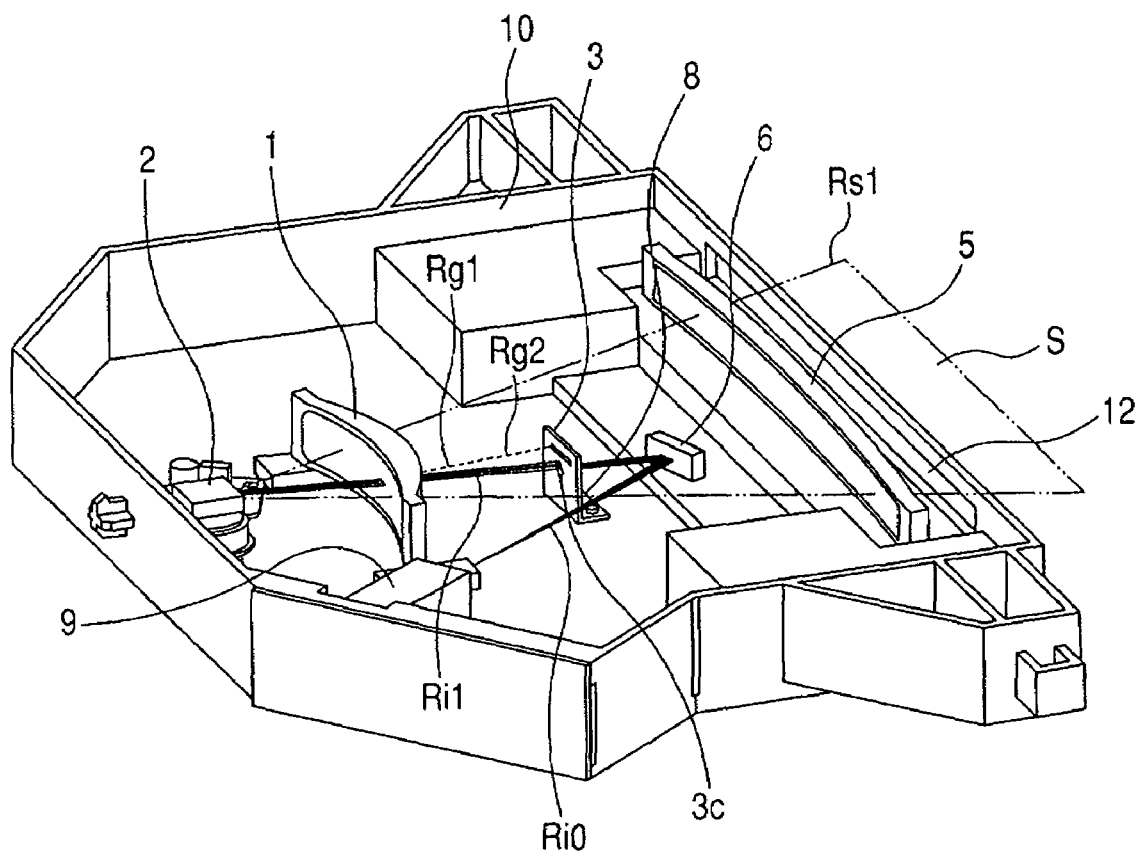
FIG. 14 is a perspective view of the optical scanning apparatus of a seventh embodiment.

FIG. 14 is a perspective view of the optical scanning apparatus of the present embodiment. The parts having the same function as the first embodiment are attached with the same reference numerals. Note that the light beam emitted from a light source 9 until reflected by a mirror 6 is attached with reference numeral Ri0, the light beam reflected by the mirror 6 until deflected by a rotation polygon mirror 2 is attached with reference numeral Ri1, and the light beam after deflected by the rotation polygon mirror 2 is attached with reference numeral Rs1. Reference numerals Rg1 and Rg2 are reflected lights from the scanning lens 1.

The optical scanning apparatus of the present embodiment, similarly to the first embodiment, is also a double path type in which the laser (light beam) generated from the light source 9 is deflected by the rotation polygon mirror 2 after having passed through a scanning lens 1, and after that, passes through the scanning lens 1 again, and emits to a surface to be scanned (photosensitive member).

The incident light beam Ri0 emitted from the light source 9 until reflected by a mirror 6 incident the mirror 6 at an angle with the optical axis of the first scanning lens 1 in the main scanning direction, and is reflected, and is guided in the direction of the rotation polygon mirror 2 (Ri1). The scanning light beam Rs1 deflected by the rotation polygon mirror 2 and having passed through the first scanning lens 1 passes through a second scanning lens 5 without being reflected by the mirror on the way, and further, emits by passing through a hole 12 provided in an optical box 10.

Similarly to the first embodiment, the light shield plate 3 to shield the reflected lights Rg1 and Rg2 from the scanning lens 1 is arranged in the upper stream side (this side) of the first scanning lens 1 in the traveling direction of the incident light beam Ri1. The scanning light beam Rs1 deflected by the rotation polygon mirror 2 passes through over the light shield plate 3. The light shield plate 3 is fastened to an optical housing 10 by screws 8. Further, the light shield plate 3 is provided with a slit 3c allowing the incident light beam Ri1 to pass through. The width in the main scanning direction of the slit 3c is narrower than the incident light beam Ri1, and the slit 3c has a aperture function to stop down a light beam width of the incident light beam Ri1.

In the case of the first embodiment, since it is the over field optical system in which the width in the main scanning direction of the light beams incident the rotation polygon mirror is larger than the width in the main scanning direction of one surface of the rotation polygon mirror, the rotation polygon mirror serves also as the aperture function.

In contrast to this, in the case of the present embodiment, since it is the under field optical system, in which the width in the main scanning direction of the light beams incident the rotation polygon mirror 2 is narrow than the width in the main scanning direction of one surface of the rotation polygon mirror 2, it is preferable that the light beams are stopped by the aperture before the light beams incident the rotation polygon mirror. Hence, in the present embodiment, the slit provided in the light shield plate has also an aperture function. If constituted in this manner, since the aperture of the light beams and the light shield of the reflected lights can be performed by one member, it is effective for the cost cutting of the apparatus.

Eighth Embodiment

Next, an eighth embodiment of the present invention will be described. The present embodiment, similarly to the first and the fifth embodiments, is an optical scanning apparatus to irradiate the laser corresponding to image information to one photosensitive member.

Figure 15:
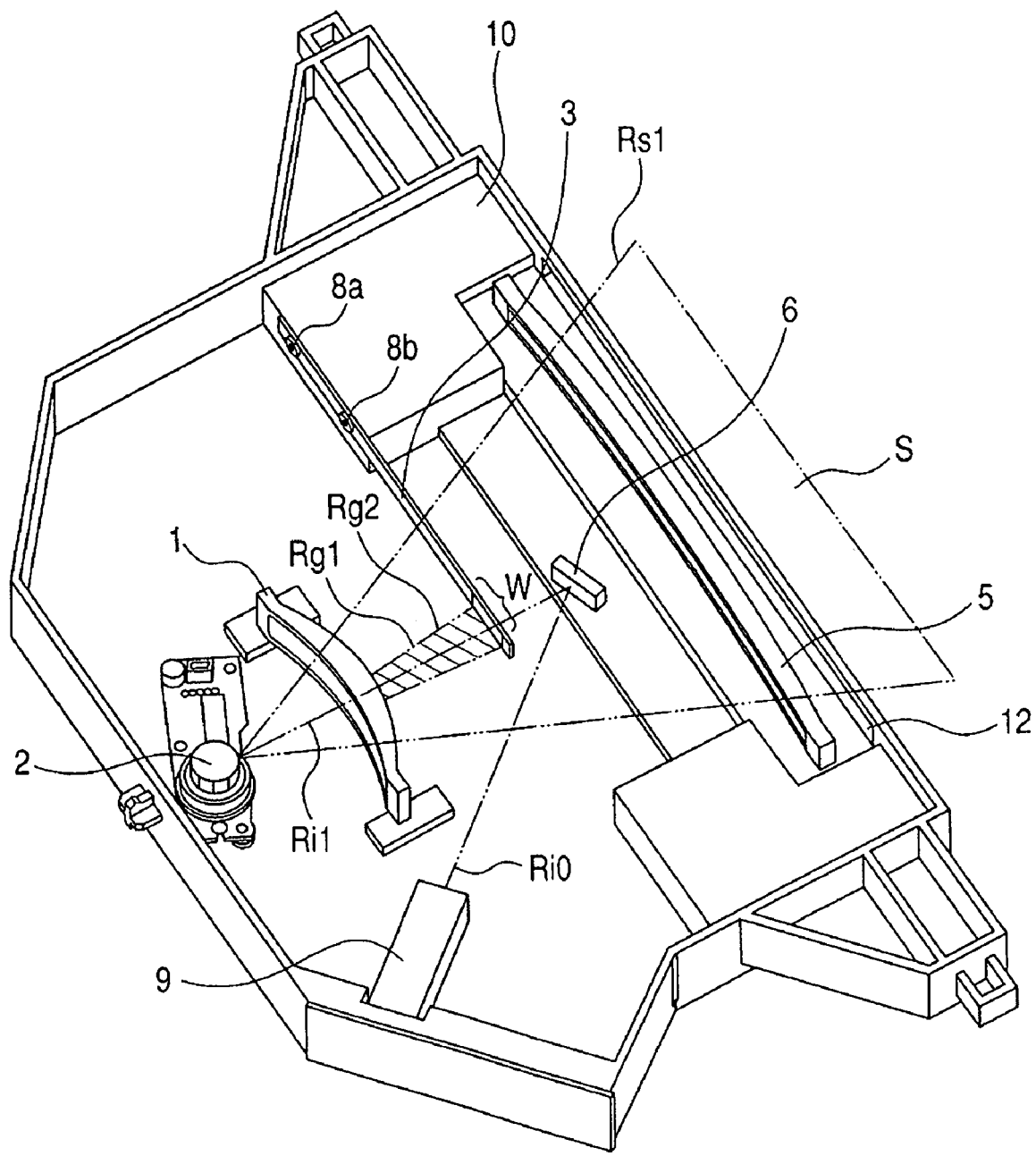
FIG. 15 is a perspective view of the optical scanning apparatus of an eighth embodiment.
Figure 16:
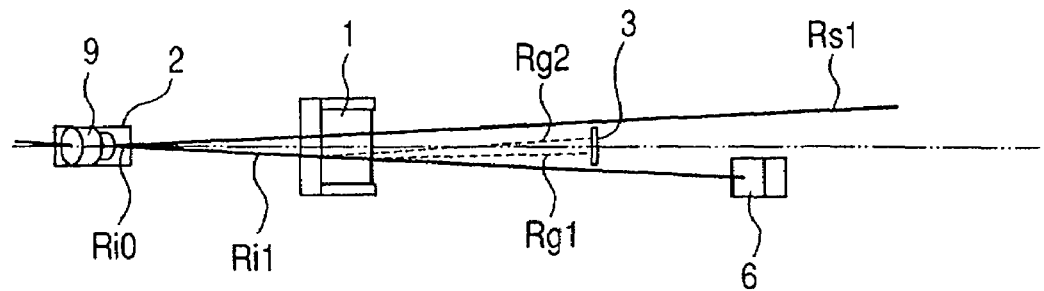
FIG. 16 is a view showing a height relationship in the sub scanning direction among a light source 9, a mirror 6 to turn back the incident light beam, a polygon mirror 2, and a light shield plate 3.
Figure 17:
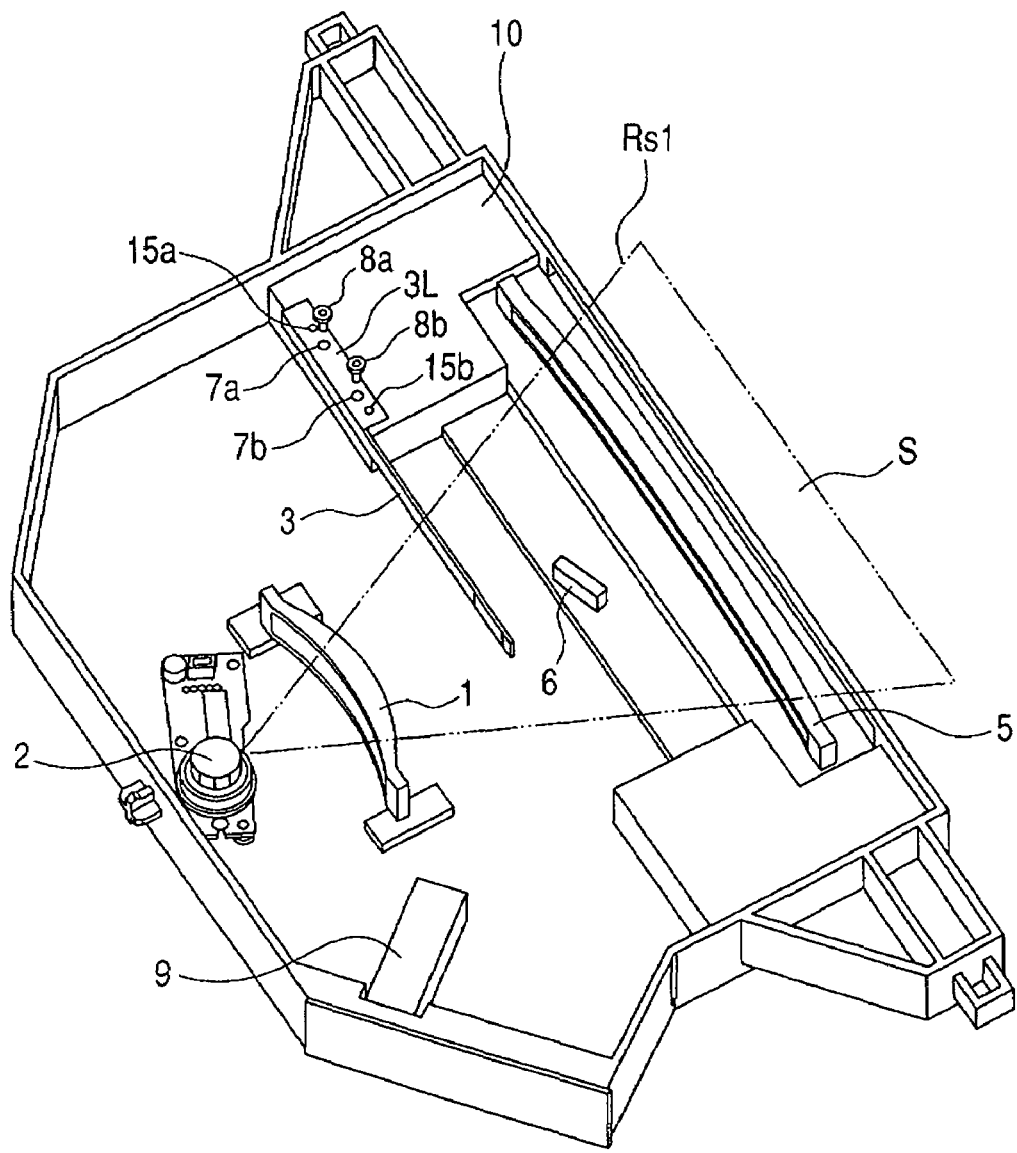
FIG. 17 is a perspective view of the optical scanning apparatus of a ninth embodiment.

FIG. 15 is a perspective view of the optical scanning apparatus of the present embodiment. The parts having the same function as the first embodiment are attached with the same reference numerals. Note that the light beam emitted from a light source 9 until reflected by a mirror 6 is attached with reference numeral Ri0, the light beam reflected by the mirror 6 until deflected by a rotation polygon mirror 2 is attached with reference numeral Ri1, and the light beam after deflected by the rotation polygon mirror 2 is attached with reference numeral Rs1. Reference numerals Rg1 and Rg2 are reflected lights from the scanning lens 1.

The optical scanning apparatus of the present embodiment, similarly to the first embodiment, is also a double path type in which the laser (light beam) generated from the light source 9 is deflected by the rotation polygon mirror 2 after having passed a scanning lens 1, and after that, passes through the scanning lens 1 again, and emits to a surface to be scanned (photosensitive member).

The incident light beam Ri0 emitted from the light source 9 until reflected by a mirror 6 incident the mirror 6 at an angle with the optical axis of the first scanning lens 1 in the main scanning direction, and is reflected, and is guided in the direction of the rotation polygon mirror 2 (Ri1). The scanning light beam Rs1 deflected by the rotation polygon mirror 2 and having passed through the first scanning lens 1 passes through a second scanning lens 5 without being reflected by the mirror on the way, and further, emits by passing through a hole 12 provided in an optical box 10.

Similarly to the first embodiment, the light shield plate 3 to shield the reflected lights Rg1 and Rg2 from the scanning lens 1 is arranged in the upper stream side (this side) of the first scanning lens 1 in the traveling direction of the incident light beam Ri1.

The light shield plate 3 of the present embodiment is fixed to the optical housing 10 by screws 8a and 8b at end portion of the opposite side to the side where the incident light beam Ri0 passes through in the laser main scanning direction (cantilever-held). Reference numeral W shown in FIG. 15 denotes the width on the light shield plate 3 of the reflected lights Rg1 and Rg2. The curvature of the first scanning lens 1 is decided so that the width W on the light shield plate 3 of the reflected lights Rg1 and Rg2 becomes narrower than the width in the main scanning direction of the scanning light beam Rs1 at a position of the same distance as the distance from the first scanning lens 1 to the light shield plate 3. The scanning light beam Rs1 passes through over than the light shield plate 3.

In this manner, the light shield plate 3 is cantilever-held at the opposite side to the side where the incident light beam Ri0 in the laser main scanning direction passes through, and therefore, the reflected lights Rg1 and Rg2 can be shielded without shielding the Ri0. Further, the width W on the light shield plate 3 of the reflected lights Rg1 and Rg2 is narrower than the width in the main scanning direction of the scanning light beam Rs1 at a position of the same distance as the distance from the first scanning lens 1 to the light shield plate 3, and therefore, the width in the laser main scanning direction of the light shield plate 3 can be made small.

Further, to turn the apparatus into a thin-model, it is necessary to raise the position of the light source 9 approximately to the same height as the height of the first scanning lens 1 and the rotation polygon mirror 2. For this purpose, as shown in the sectional view shown in FIG. 10, the incident light beam Ri0 reaching the incident light beam reflecting mirror 6 is angled in the sub scanning direction, and the reflecting surface of the incident light beam reflecting mirror 6 is preferably directed upward. By this arrangement, the height of the incident light beam Ri0 reaching the incident light beam reflecting mirror 6 becomes approximately the same height as the height of the light shield plate 3, thereby making it possible to control the thickness of the apparatus.

Ninth Embodiment

Next, a ninth embodiment of the present invention will be described. Since the present embodiment is a modified example of the eighth embodiment, the points different from that of the eighth embodiment will be described in this section.

The light shield plate 3 used in the optical scanning apparatus of the present embodiment is made of stainless. Further, similarly to the eighth embodiment, the ninth embodiment has a cantilever-held constitution, where one end portion side in a laser main scanning direction is held by an optical housing 10. The holding portion for the optical housing 10 is bent-worked (bent portion 3L), and is provided with positioning holes 15a and 15b provided in the bent portion 3L and fixed holes (screw holes) 7a and 7b. The positioning holes 15a and 15b of the light shield plates 3 are inserted into the protrusion provided in the optical housing 10, so that the position of the light shield plate 3 is decided, and by inserting the screws 8a and 8b into the screw holes 7a and 7b, the light shield plate 3 is fixed to the optical housing 10.

In this manner, the holding portion for the optical housing of the light shield plate is bent-worked, and therefore, the strength of the light shield plate is enhanced. As a result, the deformation of the light shield plate at the time to manufacture the light shield plate and at the time to attach the light shield plate to the optical housing can be prevented, thereby enhancing disposition accuracy of the light shield plate.

Further, since the light shield plate 3 can be attached to the optical housing 10 from the upper side, assembling property thereof is enhanced, and at the same time, since the directions of the screw holes 7a and 7b of the optical housing 10 are vertical, when the optical housing 10 is turned into a molded product, the production of a mold becomes easy.

Tenth Embodiment

Next, a tenth embodiment of the present invention will be described. Since the present embodiment is a modified example of the sixth embodiment, the different points from the sixth embodiment alone will be described. The present embodiment, similarly to the second and the sixth embodiments, is an optical scanning device of a 2 BOX type to irradiate the lasers corresponding to the image information to two photosensitive members, and at the same time, is an optical scanning apparatus of a double path type, in which first and second lasers (light beams) emitted from the light source 9 are deflected by a rotation polygon mirror 2 after having passed through a scanning lens 1, and after that, pass through the scanning lens 1 again, and emit to first and second surfaces to be scanned (photosensitive members). The light paths of two lasers until reaching two photosensitive members are also the same as the second embodiment, and therefore, please refer to FIG. 4.

Figure 18:
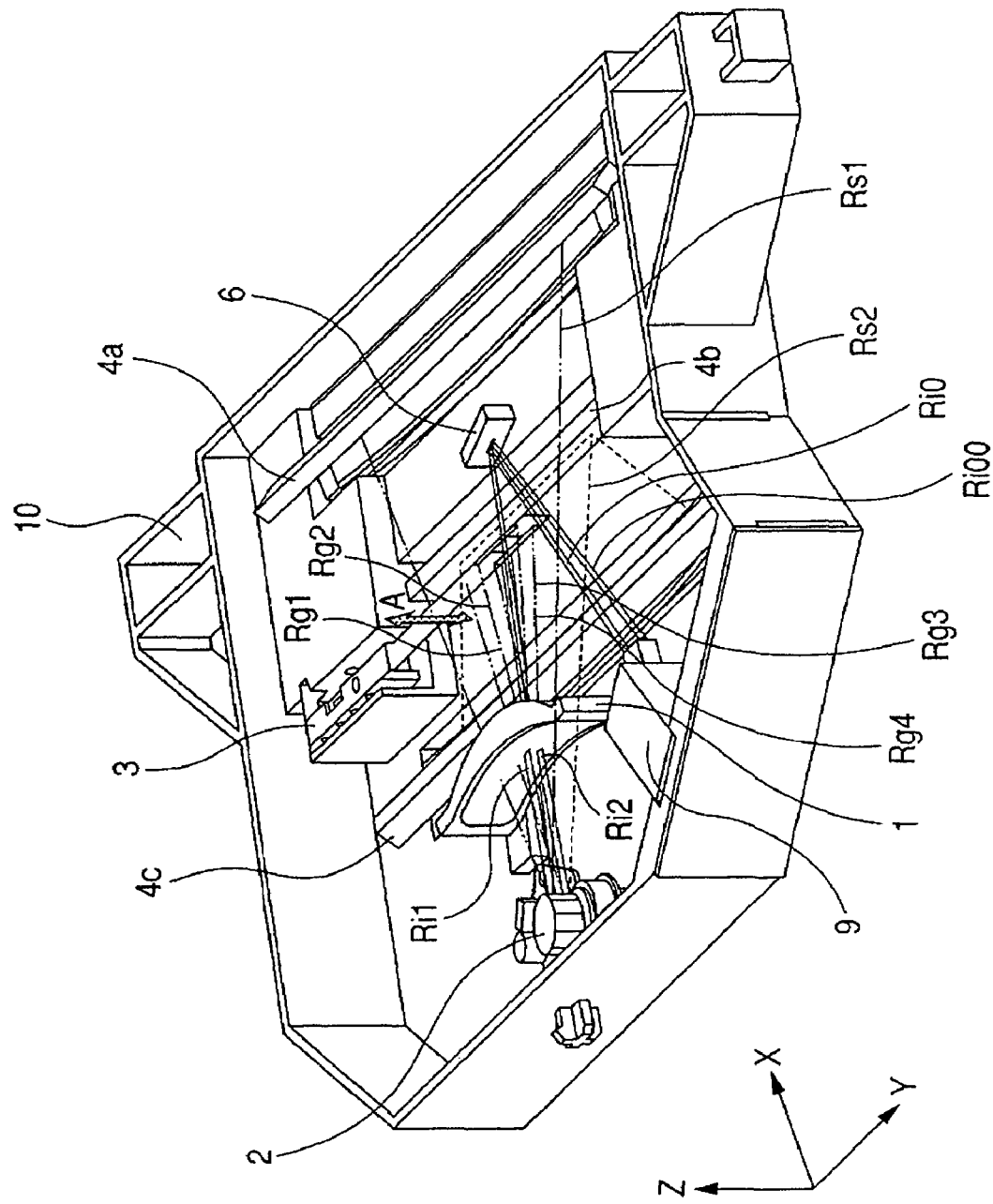
FIG. 18 is a perspective view of the optical scanning apparatus of a tenth embodiment.
Figure 19:
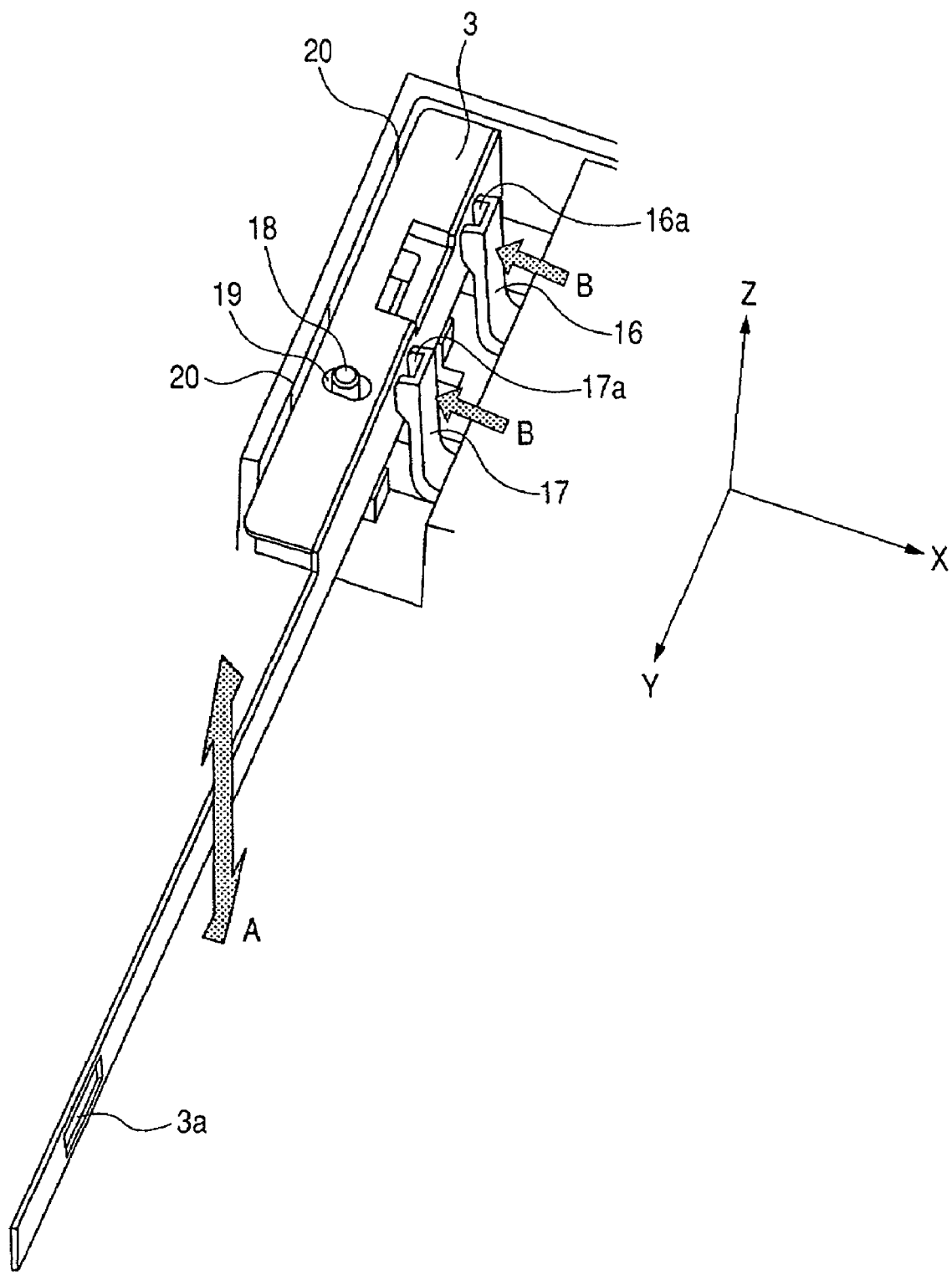
FIG. 19 is an enlarged oblique view of a holding portion of the light shield plate used in the tenth embodiment.

FIG. 18 is a perspective view of the optical scanning apparatus of the present embodiment, and FIG. 19 is an enlarged oblique view of a light shield plate 3 and its holding portion. Similarly to the second embodiment, incident light beams Ri1 and Ri2 are intersected in the upper stream side (this side) of the first scanning lens 1 in their traveling directions. Further, the light shield plate 3 to shield the reflected lights Rg1, Rg2, Rg3, and Rg4 from the scanning lens 1 is arranged at the intersecting position of the incident light beams Ri1 and Ri2 or the vicinity of the intersecting position in the traveling directions of the incident light beams Ri1 and Ri2. The light shield plate 3 is made of stainless. Further, first and second light source units shown by reference numeral 9 are arranged at a position separated from the optical axis of the scanning lens 1 in the main scanning direction. The light source unit 9 is provided with a semiconductor laser (first light source) to generate a first laser and a semiconductor laser (second light source) to generate a second laser, and the first light source and the second light source are separated in the sub scanning direction.

The light shield plate 3 of the present embodiment has the end portion opposed to the side where the incident light beams Ri0 and Ri00 pass through held by the optical housing (cantilever-held) in the laser main scanning direction. Further, the light shield plate 3 has a slit 3a through which both of the incident light beams Ri1 and Ri2 pass. The scanning light beam Rs1 after deflected by the rotation polygon mirror 2 passes through over the light shield plate 3, and the scanning light beam Rs2 after deflected by the rotation polygon mirror 2 passes through under the light shield plate 3.

In this manner, for the optical scanning apparatus of the 2 BOX type to irradiate the laser corresponding to the image information to the two photosensitive members, if the light shield plate of a cantilever-holding type to hold the end portion of the opposite side to the side where the incident light beams Ri0 and Ri00 pass through is used, a compact light shield plate that does not shield the light paths of the incident light beams Ri0 and Ri00 and the scanning light beams Rs1 and Rs2 can be provided.

The light shield plate 3 of the present embodiment can adjust the height (sub scanning direction of the laser) when assembling the apparatus. The height of the light shield plate 3 is adjustable in a direction of an arrow mark A (Z axial direction) by aligning with the reflected lights Rg1, Rg2, Rg3, and Rg4. The shield plate 3, as shown in FIG. 19, is nipped by claw portions (elastic portions) 16 and 17 and a reference bearing surface 20 of the optical housing 10. The claw portions 16 and 17 are bent upward from a portion of the resin made optical housing 10, and have elastic properties in a direction of an arrow mark B (X axial direction), and have little elastic properties also in a Y axial direction. Consequently, the light shield plate 3 is biased in the direction of the arrow mark B (X axial direction) by the claw portions 16 and 17. Note that reference numeral 18 denotes a pin integrally molded with the optical housing 10 and reference numeral 19 denotes a long hole provided in the bent portion of the light shield plate 3 and engaged with a pin 18. A long side of the long hole 19 runs in the direction of the arrow mark B, and makes it easy to attach the light shield plate 3 to a predetermined position. The short side of the long hole 19 is approximately the same length as the diameter of the pin 18, and controls the movement in the main scanning direction (Y axial direction) of the light shield plate 3. Consequently, the portion holding the light shield plate 3 is an integrally molded product of all resin made.

The reason why the light shield plate 3 requires the adjustment in height is as described below. When the reflecting angle in the sub scanning direction (Z axial direction) of the incident light beam reflecting mirror 6 is shifted, the light paths of the incident light beams Ri1 and Ri2 are shifted in the sub scanning direction (direction of an arrow mark A), and by following this shift, the light paths of the reflected lights Rg1, Rg2, Rg3, and Rg4 are also shifted. Hence, it is necessary to perform a very severe control of the angle accuracy of the incident light beam reflecting mirror 6. To perform a very severe control of the angle accuracy of the incident light beam reflecting mirror 6, there is need to take measures to obtain the angle accuracy of the mirror such as a cutting operation on the clamp face of the incident light beam reflecting mirror 6, an adjustment of the angle of the incident light beam reflecting mirror 6, and the like. However, to prepare the optical scanning apparatus at a low cost, it is not preferable to provide a mechanism which performs the cutting operation of the optical housing 10 and the adjustment of the angle of the incident light beam reflecting mirror 6.

Consequently, in case the angle accuracy of the incident light beam reflecting mirror 6 is not very severely controlled, though the light paths of the reflected lights Rg1, Rg2, Rg3, and Rg4 are moved, by adjusting the height of the light shield plate 3 so as to be aligned with those positions of the light paths, the reflected lights can be shielded.

The light shield plate 3 of which height has been adjusted is adhered and fixed to the claw portions (elastic portions) 16 and 17 of the optical housing 10. Since the light shield plate 3 is shaped like a plate, it is desirable to be prepared with a metallic material in consideration of strength.

In case the light shield plate is made of metal and the optical housing 10 is made of resin, due to the difference of expansion coefficient between the metal and resin, when environment temperatures fluctuate, stress is applied to the adhesive joint, and the adhesive join peeling is generated. The linear expansion coefficient of the optical housing is usually in the vicinity of $4.0 \times 10^{-5}$ (cm/° C.). On the other hand, in case the material of the light shield plate is taken as stainless steel plate, the linear expansion coefficient is $1.73 \times 10^{-5}$ (cm/° C.). When the distance (Y axial direction) between the two adhesive joints is taken as 50 mm, by the environmental temperature change of 30° C., a difference (Y axial direction) of the length of 34 µm is generated between the light shield plate 3 and the optical housing 10. The environmental temperature fluctuation of 30° C. is the environmental variation fully conceivable when considering the physical distribution on the way of the product. When a difference of the length of 34 µm is generated, due to the stress operating on the adhesive join, there is every possibility of the adhesive being peeled off.

Hence, in the present embodiment, as means of solving the adhesive joint peeling due to the difference of the linear expansion coefficient as described above, the adhesive is filled into adhesive pool portions 16a and 17a provided in the claw portions 16 and 17, thereby adhering and fixing the claw portions 16 and 17 and the light shield plate 6. When the environmental temperature rises, though the optical housing 10 of resin made tries to expand greatly in the Y axial direction, the expansion of the light shield plate 3 of stainless steel made in the Y axial direction is smaller than the optical housing 10. However, even if the interval of the roots of claw portions 16 and 17 integrally molded with the optical box 10 is expanded due to thermal expansion, the claw portions 16 and 17 have slight elastic properties in the Y axial direction also, and can bend so that the enlargement of the interval of the adhesive pool portions 16a and 17b can be controlled. Hence, the stress operating on the adhesive filled into the adhesive pool portions 16a and 17a is eased, and the peeling off of the adhesive can be prevented.

Further, even in case the material of the light shield plate 3 is taken as resin, there is a case where the stress is operated on the adhesive joint due to warp and deformation by thermal expansion. Consequently, even if the material of the light shield plate is resin, the fixing method of the light shield plate of the present embodiment is effective.

Further, even in case mechanical shock is applied to the optical scanning apparatus, by elastic properties of the claw portions 16 and 17, the mechanical shock is absorbed, and therefore, the force applied on the adhesive joint of the claw portions 16 and 17 of the light shield plate 3 can be eased, and there is an advantage of being able to prevent the peeling off of the adhesive joint.

Further, in the present embodiment, while the optical housing 10 is allowed to have the claw portions 16 and 17, the light shield plate 3 may be provided with the claw portions 16 and 17.

Thus, while a description has been made on the embodiments of the present invention, it does not matter if the material of the light shield plate 3 is not metal. However, if the strength necessary to secure the light shield accuracy (positional accuracy of the light shield plate) is taken into consideration, metal such as stainless steel is preferable.

Further, in all the embodiments as described above, the light shield plate 3 is not treated with a non-reflecting coating on the surface. In stead of that, countermeasures such as making an angle with the light shield plate may be preferably taken so that the reflected lights Rg1 to Rg4 from the first scanning lens 1 are shielded by the light shield plate 3, and after that, do not travel to the photosensitive members again. However, by treating the light shield plate 3 with a non-reflecting coating, the reflected lights Rg1 to Rg4 shielded by the light shield plate 3 are preferably not allowed to travel to the scanning lens 1 again.

Further, in all the embodiments as described above, while the rotation polygon mirror has been used as the deflection device, the deflection device of the type that does not rotate (but can swing) such as a galvanometer mirror may be preferably used.

It will be appreciated that the present invention is not limited by the above described embodiments, but includes any variations of the embodiments within the scope of the invention.

This application claims a priority from Japanese Patent Application Nos. 2004-229189 filed on Aug. 5, 2004 and 2005-222903 filed on Aug. 1, 2005, and cites the contents thereof so as to be incorporated as a part of this application.

What is claimed is:

1. An optical scanning apparatus, comprising:
    a light source generating a laser beam;
    a deflection device to deflect the laser beam generated from the light source; and
    a scanning lens through which the laser beam deflected by said deflection device passes,
    wherein after the laser beam passes through said scanning lens, the laser beam generated from said light source is deflected by said deflection device, again passes through said scanning lens, and emits to the surface to be scanned,
        a light shield plate to shield the reflected light reflected by said scanning lens and traveling to said surface to be scanned is provided at the opposite side to the side where said deflection device is arranged with said scanning lens, as a boundary, and
        wherein, in a case that a distance between said deflection device and said scanning lens is taken as $L_1$ (mm), the distance between said deflection device and said light shield plate is taken as $L_2$ (mm), a thickness of said scanning lens as T (mm), an incident angle in the sub scanning direction of said laser beam to said deflection device as $\alpha$, and a convergent angle of said laser beam as $2\theta$, said light shield plate is arranged within the range of satisfying the following formula:

$$\frac{2\tan(\alpha+\theta)(L_1+T)+0.5\text{mm}}{\tan(\alpha+\theta)+\tan(\alpha+\theta)} < L_2 < \frac{2\tan(\alpha+\theta)L_1-0.5\text{mm}}{\tan(\alpha+\theta)-\tan(\alpha-\theta)}.$$

2. An optical scanning apparatus according to claim 1, wherein said light shield plate has a slit through which said laser beam traveling to said deflection device passes.

3. An optical scanning apparatus according to claim 2, wherein said slit has a aperture function to stop the laser beam traveling to said deflection device.

4. An optical scanning apparatus according to claim 1, wherein said light shield plate has one end in the sub scanning direction held by a housing of said apparatus.

5. An optical scanning apparatus according to claim 1, wherein said light shield plate has one end side in the main scanning direction cantilever-held by the housing of said apparatus.

6. An optical scanning apparatus according to claim 5, wherein said light source is arranged at a position separated from the optical axis of said scanning lens in the main scanning direction, and said apparatus further comprises a mirror to reflect the laser beam generated from said light source to said deflection device, and said light shield plate is held by the housing of said apparatus at an end portion at the opposite side to the light path of the laser beam traveling from said light source to said mirror with the optical axis of said scanning lens taken as a boundary in the main scanning direction.

7. An optical scanning apparatus according to claim 6, wherein a length in the main scanning direction of said light shield plate is a length not reaching until the light path of the laser beam traveling from said light source to said mirror.

8. An optical scanning apparatus according to claim 1, wherein said light shield plate has both ends in the main scanning direction dual-support held by the housing of said apparatus.

9. An optical scanning apparatus according to claim 8, wherein said light source is arranged at a position separated from the optical axis of said scanning lens in the main scanning direction, and said apparatus further comprises a mirror to reflect the laser beam generated from said light source to said deflection device, and said light shield plate has a slit through which the laser beam traveling from said light source to said mirror passes, and a slit through which the laser beam traveling from said mirror to said deflection device passes.

10. An optical scanning apparatus according to claim 1, wherein said light shield plate is inclined toward the pivot axis of said deflection device.

11. An optical scanning apparatus, comprising:
    a first light source generating a first laser beam;
    a second light source generating a second laser beam;
    a deflection device to deflect the first and second laser beams generated from said first and second light sources; and
    a scanning lens through which the first and second laser beams deflected by said deflection device pass,
    wherein after both the first and second laser beams generated from said first and second light sources pass through said scanning lens, the first and second laser beams generated from said first and second light sources are deflected by said deflection device, pass through said scanning lens again, and emit toward a first surface to be scanned and a second surface to be scanned, respectively,
        a light shield plate to shield a reflected light reflected by said scanning lens and traveling to said first or second surfaces to be scanned is provided at the opposite side to the side where said deflection device is arranged with said scanning lens taken as a boundary,
        wherein in a case that a distance between said deflection device and said scanning lens is taken as $L_1$ (mm), a distance between said deflection device and said light shield plate is taken as $L_2$ (mm), a distance in the sub scanning direction of said first and second laser beams to incident said deflection device as $L_3$ (mm), a thickness of said scanning lens as T (mm), an incident angle in the sub scanning direction of each of said first and second laser beams to said deflection device as $\alpha$, and the convergent angle of each of the first and second laser beams as $2\theta$, said light shield plate is arranged within the range of satisfying the following formula:

$$\frac{L_3}{2\tan\alpha}-30\text{mm} < L_2 < \frac{L_3}{2\tan\alpha}+30\text{mm}$$

and $$\frac{2\tan(\alpha+\theta)(L_1+T)}{\tan(\alpha+\theta)+\tan(\alpha-\theta)} < L_2 < \frac{2\tan(\alpha+\theta)L_1}{\tan(\alpha+\theta)-\tan(\alpha-\theta)}.$$

12. An optical scanning apparatus according to claim 11, wherein the first and second laser beams traveling from said first and second light sources to said deflection device are intersected short of said scanning lens in the traveling direction of the laser beams.

13. An optical scanning apparatus according to claim 11, wherein said light shield plate has one slit through which both of said first and second laser beams traveling to said deflection device pass.

14. An optical scanning apparatus according to claim 13, wherein said slit has a aperture function to stop the laser beams traveling to said deflection device.

15. An optical scanning apparatus according to claim 11, wherein said light shield plate has one end in the sub scanning direction held by the housing of said apparatus.

16. An optical scanning apparatus according to claim 11, wherein said light shield plate has one end side in the main scanning direction cantilever-held by the housing of said apparatus.

17. An optical scanning apparatus according to claim 16, wherein said first and second light sources are arranged at a position separated from the optical axis of said scanning lens in the main scanning direction, and said apparatus further comprises a mirror to reflect the first and second laser beams generated from said first and second light sources to said deflection device, and said light shield plate is held by the housing of said apparatus at an end portion at the opposite side to the light path of the first and second laser beams traveling from said first and second light sources to said mirror with an optical axis of said scanning lens taken as a boundary in the main scanning direction.

18. An optical scanning apparatus according to claim 17, wherein a length in the main scanning direction of said light shield plate is a length not reaching the light path of the laser beams traveling from said first and second light sources to said mirror.

19. An optical scanning apparatus according to claim 11, wherein said light shield plate has both ends in the main scanning direction dual-support held by the housing of said apparatus.

20. An optical scanning apparatus according to claim 19, wherein said first and second light sources are arranged at a position separated from the optical axis of said scanning lens in the main scanning direction, and said apparatus further comprises a mirror to reflect the first and second laser beams generated from said first and second light sources to said deflection device, and said light shield plate has a slit through which the first and second laser beams traveling from said first and second light sources to said mirror pass, and a slit through which the first and second laser beams traveling from said mirror to said deflection device pass.

21. An optical scanning apparatus according to claim 11, wherein said light shield plate is inclined toward the pivot axis of said deflection device.

22. An optical scanning apparatus, comprising:
a first light source generating a first laser beam;
a second light source generating a second laser beam;
a deflection device to deflect the first and second laser beams generated from said first and second light sources; and
a scanning lens through which the first and second laser beams deflected by said deflection device pass,
wherein after both the first and second laser beams generated from said first and second light sources pass through said scanning lens, both the first and second laser beams generated from said first and second light sources are deflected by said deflection device, pass through said scanning lens again, and emit toward a first surface to be scanned and a second surface to be scanned, respectively,
wherein said first and second laser beams generated from said first and second light sources and traveling to said deflection device are intersected short of said scanning lens, and at this intersecting position or in the vicinity of the intersecting position, a light shield plate to shield the reflected light reflected by said scanning lens and traveling to said first and second surfaces to be scanned is provided.

23. An optical scanning apparatus according to claim 22, wherein said light shield plate has one slit through which both of said first and second laser beams traveling to said deflection device pass.

24. An optical scanning apparatus according to claim 22, wherein said light shield plate has one end side in the main scanning direction cantilever-held by the housing of said apparatus.

25. An optical scanning apparatus according to claim 24, wherein said first and second light sources are arranged at a position separated from the optical axis of said scanning lens in the main scanning direction, and said apparatus further comprises a mirror to reflect the first and second laser beams generated from said first and second light sources to said deflection device, and said light shield plate is held by the housing of said apparatus at the end portion of the opposite side to the light path of the first and second laser beams traveling from said first and second light sources to said mirror with the optical axis of said scanning lens taken as a boundary in the main scanning direction.

26. An optical scanning apparatus according to claim 22, wherein the first laser beam deflected by said deflection device passes through over said light shield plate, and the second laser beam deflected by said deflection device passes through under said light shield plate.

27. An optical scanning apparatus according to claim 22, wherein said light shield plate is fixed to an elastic portion of the optical housing with adhesive.

* * * * *

UNITED STATES PATENT AND TRADEMARK OFFICE
CERTIFICATE OF CORRECTION

PATENT NO. : 7,355,771 B2
APPLICATION NO. : 11/341858
DATED : April 8, 2008
INVENTOR(S) : Ken-ichi Tomita et al.

It is certified that error appears in the above-identified patent and that said Letters Patent is hereby corrected as shown below:

COLUMN 1
  Line 44, "scanned of" should read --scanned on--; and
  Line 67, "though" should read --through--.

COLUMN 8
  Line 67, "20 (in this" should read --2θ (in this--.

COLUMN 12
  Line 26, "defined as 20" should read --defined as 2θ--; and
  Line 60, "angle a" should read --angle α--.

COLUMN 23
  Line 25, "lens, as" should read --lens taken as--;

Line 36, " $\dfrac{2\tan(\alpha+\theta)(L_1+T)+0.5mm}{\tan(\alpha+\theta)+\tan(\alpha+\theta)} < L_2 < \dfrac{2\tan(\alpha+\theta)L_1-0.5mm}{\tan(\alpha+\theta)-\tan(\alpha-\theta)}$ " should read -- $\dfrac{2\tan(\alpha+\theta)(L_1+T)+0.5mm}{\tan(\alpha+\theta)+\tan(\alpha-\theta)} < L_2 < \dfrac{2\tan(\alpha+\theta)L_1-0.5mm}{\tan(\alpha+\theta)-\tan(\alpha-\theta)}$ --; and Line 45, "a aperture" should read --an aperture--.

COLUMN 25
  Line 9, "a aperture" should read --an aperture--.

Signed and Sealed this

Thirtieth Day of September, 2008

JON W. DUDAS
*Director of the United States Patent and Trademark Office*